(12) United States Patent
Jin et al.

(10) Patent No.: US 11,329,569 B2
(45) Date of Patent: May 10, 2022

(54) POWER CONVERSION SYSTEM

(71) Applicant: Delta Electronics, Inc., Taoyuan (TW)

(72) Inventors: Da Jin, Taoyuan (TW); Yahong Xiong, Taoyuan (TW); Qinghua Su, Taoyuan (TW)

(73) Assignee: DELTA ELECTRONICS, INC., Taoyuan (TW)

(\*) Notice: Subject to any disclaimer, the term of this patent is extended or adjusted under 35 U.S.C. 154(b) by 0 days.

(21) Appl. No.: 17/133,061

(22) Filed: Dec. 23, 2020

(65) Prior Publication Data

US 2021/0211059 A1 Jul. 8, 2021

(30) Foreign Application Priority Data

Jan. 3, 2020 (CN) .......................... 202010005600.2

(51) Int. Cl.
*H02M 1/00* (2006.01)
*H02M 3/335* (2006.01)
*H02M 1/36* (2007.01)

(52) U.S. Cl.
CPC ......... *H02M 3/33576* (2013.01); *H02M 1/36* (2013.01); *H02M 1/0003* (2021.05); *H02M 1/007* (2021.05); *H02M 1/0067* (2021.05)

(58) Field of Classification Search
CPC .. H02M 1/0067; H02M 1/007; H02M 1/0074; H02M 1/0077
See application file for complete search history.

(56) References Cited

U.S. PATENT DOCUMENTS

| | | | |
|---|---|---|---|
| 6,211,657 B1* | 4/2001 | Goluszek | H02M 3/1584 323/272 |
| 6,417,649 B1 | 7/2002 | Brink | |
| 9,692,313 B1* | 6/2017 | Isurin | H02M 7/515 |
| 2005/0184712 A1* | 8/2005 | Wei | H02M 3/156 323/282 |
| 2006/0125457 A1* | 6/2006 | Lin | H02M 3/1584 323/282 |

(Continued)

FOREIGN PATENT DOCUMENTS

| | | |
|---|---|---|
| CN | 102916603 A | 2/2013 |
| CN | 101420179 B | 3/2013 |

(Continued)

*Primary Examiner* — Gary A Nash
(74) *Attorney, Agent, or Firm* — Kirton McConkie; Evan R. Witt

(57) ABSTRACT

A power conversion system includes a power conversion circuit and a start-up circuit. The power conversion circuit includes an output capacitor, a first switching unit, a second switching unit, a flying capacitor and a magnetic element. The second switching unit includes two switch groups. The flying capacitor is connected between a first terminal and a second terminal of the power conversion circuit. The magnetic element includes two first windings that are electromagnetically coupled with each other. A first one of the two first windings is electrically connected between one switch group and the second terminal of the power conversion circuit. A second one of the two first windings is electrically connected between the other switch group and the second terminal of the power conversion circuit. The start-up circuit includes a third winding and an inductor. The third winding is electromagnetically coupled with the first windings.

25 Claims, 27 Drawing Sheets

(56) References Cited

U.S. PATENT DOCUMENTS

2012/0007576 A1* 1/2012 Suntio ................. H02M 3/1582
 323/312

FOREIGN PATENT DOCUMENTS

| | | |
|---|---|---|
| CN | 103973094 B | 8/2016 |
| CN | 106230253 A | 12/2016 |
| CN | 104467016 B | 7/2017 |
| CN | 108768194 A | 11/2018 |
| CN | 106301046 B | 12/2018 |
| CN | 109039048 A | 12/2018 |
| CN | 104242625 B | 1/2019 |
| CN | 107070276 B | 4/2019 |
| CN | 109617148 A | 4/2019 |
| CN | 108512407 B | 8/2019 |
| CN | 110120748 A | 8/2019 |
| CN | 110677060 A | 1/2020 |
| CN | 108847769 B | 3/2020 |
| CN | 111277131 A | 6/2020 |
| EP | 3240169 A1 * | 11/2017 ............ H02M 3/158 |
| JP | 2005086957 A | 3/2005 |

* cited by examiner

POWER CONVERSION SYSTEM

CROSS-REFERENCE TO RELATED APPLICATION

This application claims priority to China Patent Application No. 202010005600.2, filed on Jan. 3, 2020. The entire contents of the above-mentioned patent application are incorporated herein by reference for all purposes.

FIELD OF THE INVENTION

The present invention relates to a power conversion system, and more particularly to a power conversion system capable of simultaneously pre-charging a flying capacitor and an output capacitor to achieve a soft-start function.

BACKGROUND OF THE INVENTION

Nowadays, the resonant power conversion circuit having a non-isolated circuit topology with an expandable duty-cycle is widely used in the high current application. The resonant power conversion circuits are usually divided into a symmetrical type and an asymmetrical type. In the prior power conversion circuit, regardless of the type of the power conversion circuit, the ratio of the input voltage to the output voltage is set to be fixed. Alternatively, the ratio of the input voltage to the output voltage can be determined and adjusted according to the practical requirements.

The resonant power conversion circuit with an expandable duty-cycle circuit topology usually includes a flying capacitor and an output capacitor. When the power conversion circuit is started up, a large current is generated because the terminal voltages of the flying capacitor and the output capacitor are low. The large current results in a large current inrush on the electronic components of the power conversion circuit. Consequently, the electronic components of the power conversion circuit are readily damaged. For protecting the electronic components, it is necessary to use the electronic components with high current-resistant properties. However, the electronic components with high current-resistant properties are not cost-effective.

SUMMARY OF THE INVENTION

An object of the present invention provides a power conversion system. The power conversion system includes a power conversion circuit and a start-up circuit. The start-up circuit is used to pre-charge a flying capacitor and an output capacitor of the power conversion circuit. When the terminal voltages of the flying capacitor and the output capacitor are charged to the preset voltage, the start-up process of the power conversion circuit is completed. Consequently, the electronic components in the power conversion system (e.g., switches) will not be suffered from the impact of the large current, and the possibility of causing the damage of the electronic components is largely reduced. Moreover, the cost-effective electronic components can be employed.

In accordance with an aspect of the present invention, a power conversion system is provided. The power conversion system includes a power conversion circuit and a start-up circuit. The power conversion circuit includes a first terminal, a second terminal, an output capacitor, at least one switching unit, at least one flying capacitor and a magnetic element. Each switching unit includes two switch groups. The at least one flying capacitor is connected between the first terminal and the second terminal of the power conversion circuit. The magnetic element includes two first windings. The two first windings are electromagnetically coupled with each other. A first one of the two first windings is electrically connected between a first one of the two switch groups and the second terminal of the power conversion circuit. A second one of the two first windings is electrically connected between a second one of the two switch groups and the second terminal of the power conversion circuit. The opposite-polarity terminals of the two first windings are electrically connected with the second terminal of the power conversion circuit. The start-up circuit is configured to control the power conversion circuit to start and includes a third winding and an inductor. The third winding is electromagnetically coupled with the two first windings. The inductor is connected with the third winding in series. A voltage across a first terminal and a second terminal of a serially-connected branch of the third winding and the inductor is an alternating voltage. During a start-up process of the power conversion circuit, the at least one flying capacitor and the output capacitor are pre-charged to a preset voltage by the alternating voltage through the third winding.

In accordance with another aspect of the present invention, a power conversion system is provided. The power conversion system includes a power conversion circuit and a start-up circuit. The power conversion circuit includes a first terminal, a second terminal, an output capacitor, at least one first switching unit, a second switching unit, at least one flying capacitor and a magnetic element. The first switching unit includes a first switch group and a second switch group. The second switching unit includes a third switch group and a fourth switch group. The at least one flying capacitor is connected between the first terminal and the second terminal of the power conversion circuit. The magnetic element includes two first windings. The two first windings are electromagnetically coupled with each other. A first one of the two first windings is electrically connected between the third switch group and the second terminal of the power conversion circuit. A second one of the two first windings is electrically connected between the fourth switch group and the second terminal of the power conversion circuit. The opposite-polarity terminals of the two first windings are electrically connected with the second terminal of the power conversion circuit. The magnetic element has an equivalent leakage inductor. A resonant effect between the equivalent leakage inductor and the at least one flying capacitor generates a resonant current. The resonant current transfers electric energy to the first terminal or the second terminal of the power conversion circuit. During a start-up process of the power conversion circuit, the output capacitor is pre-charged to a first preset voltage, and the at least one flying capacitor is pre-charged to a second preset voltage. The first preset voltage is higher than or equal to 70% of a steady state voltage of the output capacitor. The second preset voltage is higher than or equal to 70% of a steady state voltage of the corresponding flying capacitor.

In accordance with another aspect of the present invention, a power conversion system is provided. The power conversion system includes at least two power conversion circuits having a circuit topology as described above and a start-up circuit having a circuit topology as described above. Each of the at least two power conversion circuits includes a first terminal and a second terminal. The first terminals of the at least two power conversion circuits are electrically connected in parallel, and the second terminals of the at least two power conversion circuits are electrically connected in parallel. The start-up circuit is configured to control the at least two power conversion circuits to start and includes two third windings. The two third windings are connected in parallel, and each of the two third windings is electromagnetically coupled with the magnetic element of a corresponding power conversion circuit of the at least two power conversion circuits.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
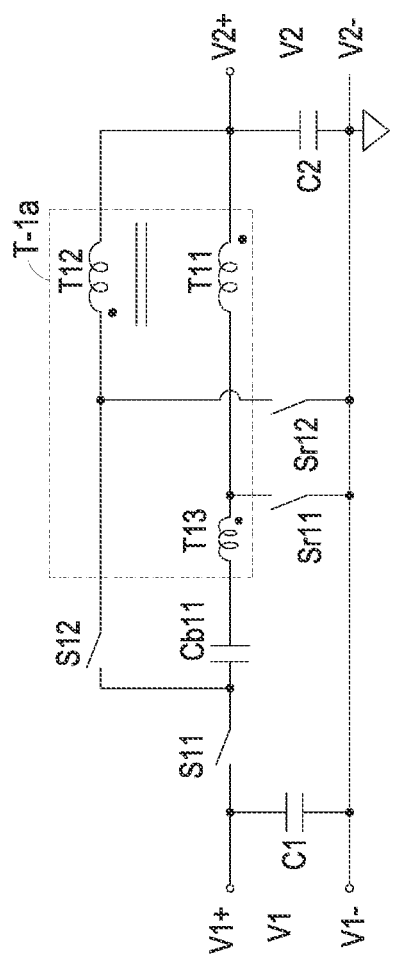
FIG. 1A is a schematic circuit diagram illustrating a first example of a power conversion circuit.
Figure 1B:
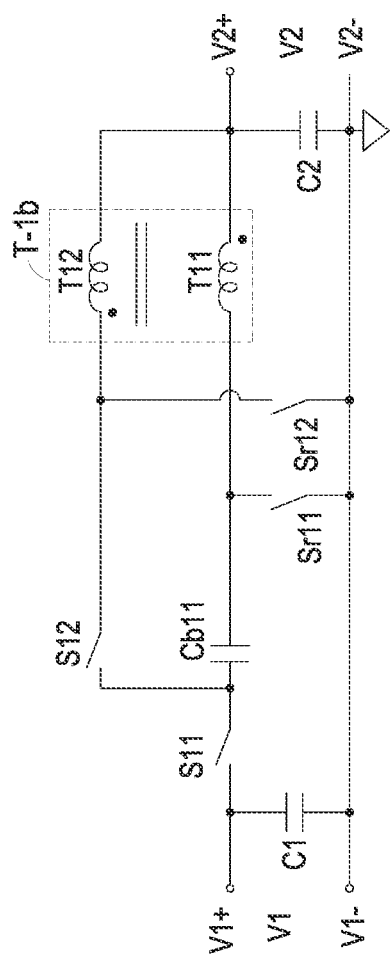
FIG. 1B is a schematic circuit diagram illustrating a second example of a power conversion circuit.
Figure 2A:
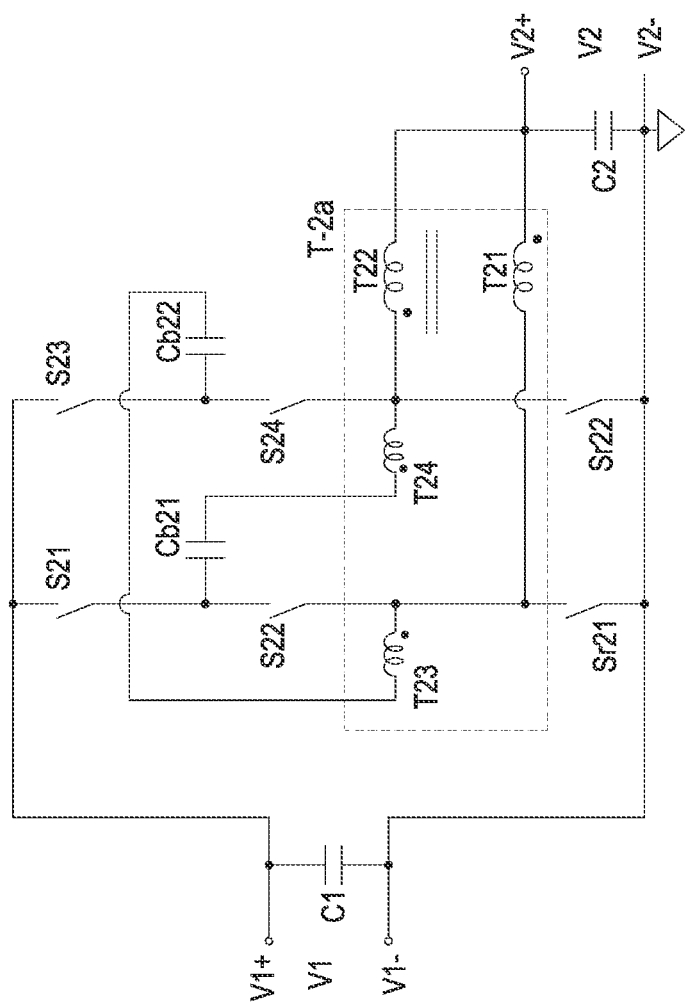
FIG. 2A is a schematic circuit diagram illustrating a third example of a power conversion circuit.
Figure 2B:
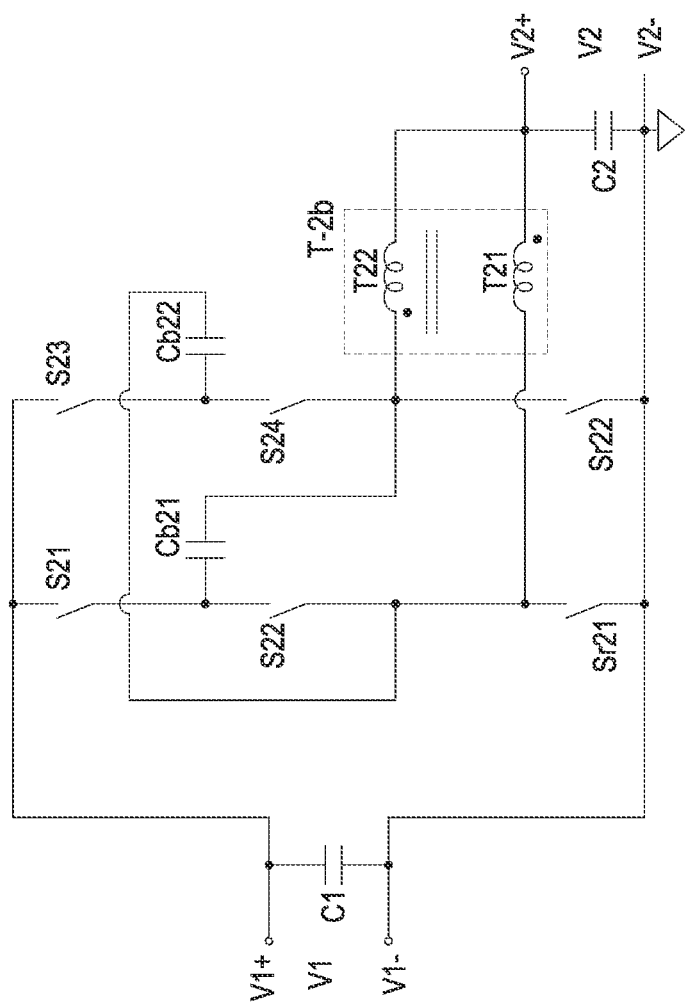
FIG. 2B is a schematic circuit diagram illustrating a fourth example of a power conversion circuit.
Figure 2C:
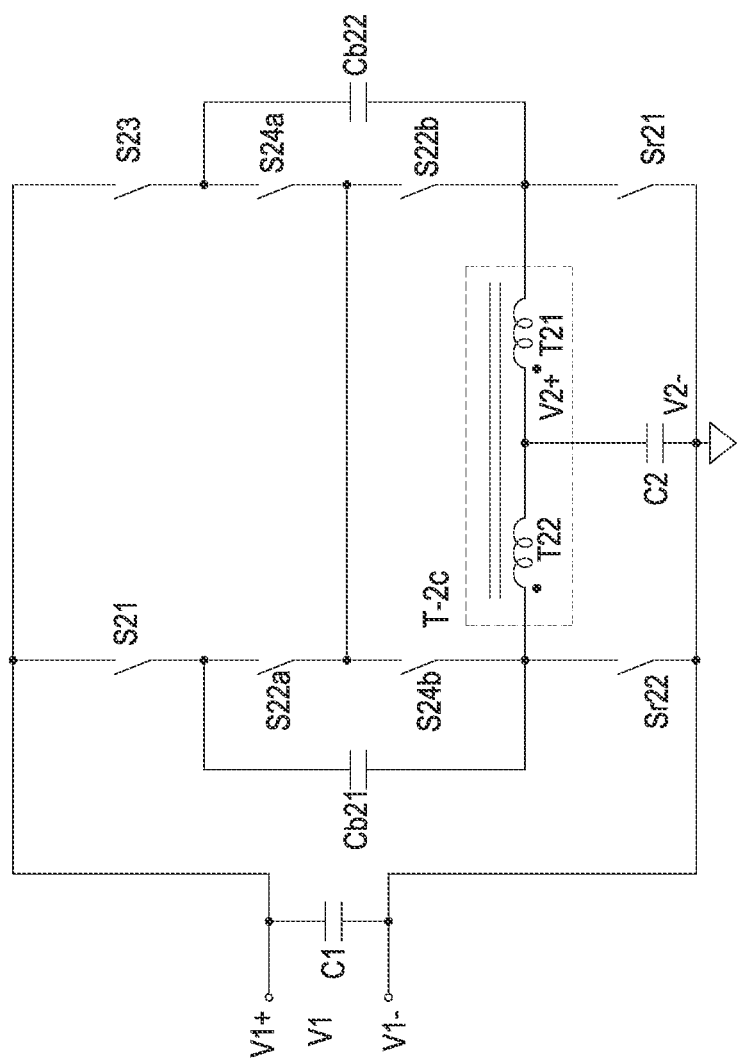
FIG. 2C is a schematic circuit diagram illustrating a fifth example of a power conversion circuit.
Figure 2D:
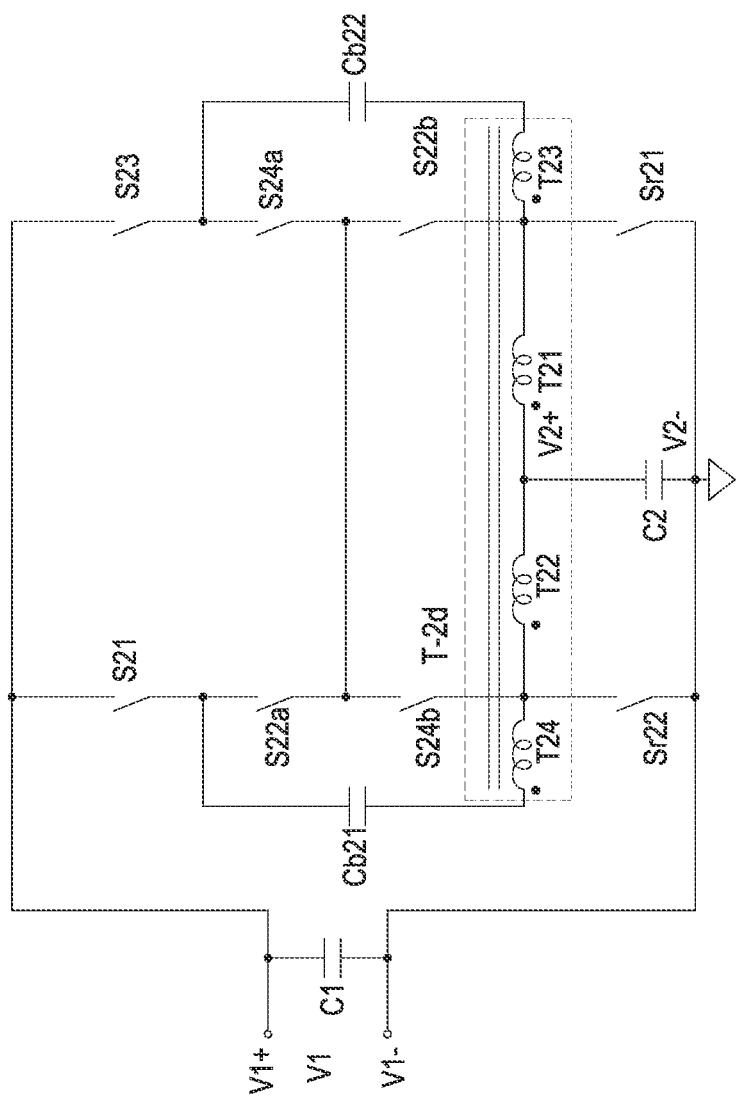
FIG. 2D is a schematic circuit diagram illustrating a sixth example of a power conversion circuit.

FIG. 1A is a schematic circuit diagram illustrating a first example of a power conversion circuit. FIG. 1B is a schematic circuit diagram illustrating a second example of a power conversion circuit. FIG. 2A is a schematic circuit diagram illustrating a third example of a power conversion circuit. FIG. 2B is a schematic circuit diagram illustrating a fourth example of a power conversion circuit. FIG. 2C is a schematic circuit diagram illustrating a fifth example of a power conversion circuit. FIG. 2D is a schematic circuit diagram illustrating a sixth example of a power conversion circuit. Each of the power conversion circuits has the function of converting the electric power in the bidirectional manner. Moreover, the power conversion circuit has a resonant type circuit topology. Each power conversion circuit includes a first terminal (including a first positive electrode V1+ and a first negative electrode V1−), a second terminal (including a second positive electrode V2+ and a second negative electrode V2−), at least one first switching unit, a second switching unit, a first capacitor, a second capacitor, at least one flying capacitor and a magnetic element. The first negative electrode V1− and the second negative electrode V2− are connected to a ground terminal.

As shown in FIG. 1A, the power conversion circuit 1a has an asymmetric circuit topology, in which the ratio of the input voltage to the output voltage is N:1. The power conversion circuit 1a includes a first switching unit and a second switching unit. The first switching unit includes a first switch group and a second switch group, which are electrically connected with each other. The first switch group includes a first switch S11. The second switch group includes a second switch S12. The second switching unit includes a third switch group and a fourth switch group. The third switch group includes a third switch Sr11. The fourth switch group includes a fourth switch Sr12. The third switch Sr11 is electrically connected with the first switch S11. The fourth switch Sr12 is electrically connected with the second switch S12. The on/off states of the first switch S11 and the fourth switch Sr12 are identical. The on/off states of the second switch S12 and the third switch Sr11 are identical. The phase difference between the control signals for controlling the on/off states of the first switch S11 and the second switch S12 is 180 degrees.

The first capacitor C1 is electrically connected between the first positive electrode V1+ and the first negative electrode V1−. The second capacitor C2 is electrically connected between the second positive electrode V2+ and the second negative electrode V2−. The flying capacitor Cb11 is electrically connected to the first switch S11 and the second positive electrode V2+, and electrically connected with the second switch S12.

The magnetic element T-1a includes two first windings T11, T12 and a second winding T13. The two first windings T11, T12 and the second winding T13 are electromagnetically coupled with each other through the same magnetic core (not shown). The first winding T11 is electrically connected between the first switch S11 and the second positive electrode V2+. The first winding T12 is electrically connected between the second switch S12 and the second positive electrode V2+. The second winding T13 and the flying capacitor Cb11 are connected between the first switch S11 and the first winding T11. The second terminal of the first winding T11 and the second terminal of the first winding T12 are electrically connected with each other and further connected to the second positive electrode V2+. The second terminal of the first winding T11 and the second terminal of the first winding T12 are opposite-polarity terminals. The turn ratio between the second winding T13, the first winding T11 and the first winding T12 is N:1:1, wherein N is a positive value, and preferably a positive integer. Due to the arrangement of the second winding T13, the flexibility of designing the ratio of the input voltage to the output voltage in the power conversion circuit is enhanced and the applications of the power conversion circuit are expanded. As the switches in the power conversion circuit 1a are alternately turned on and off, the resonant effect between the flying capacitor Cb11 and the equivalent leakage inductor of the magnetic element T-1a generates a resonant current. The resonant current has a resonant period and a resonant frequency. The resonant current transfers electric energy to the first terminal or the second terminal of the power conversion circuit 1a.

In comparison with the embodiment of FIG. 1A, the magnetic element T-1b of the power conversion circuit 1b as shown in FIG. 1B includes two first windings T11 and T12. In addition, the two first windings T11 and T12 are wound around the same magnetic core to result in an electromagnetic coupling effect. The first winding T11 is electrically connected between the first switch S11 and the second positive electrode V2+. The first winding T12 is electrically connected between the second switch S12 and the second positive electrode V2+. The second terminal of the first winding T11 and the second terminal of the first winding T12 (i.e., opposite-polarity terminals) are electrically connected with each other and further connected to the second positive electrode V2+. The turn ratio between the first winding T11 and the first winding T12 is 1:1. The ratio of the input voltage to the output voltage of the power conversion circuit 1b is 4:1. As the switches in the power conversion circuit 1b are alternately turned on and off, the resonant effect between the flying capacitor Cb11 and the equivalent leakage inductor of the magnetic element T-1b generates a resonant current. The resonant current has a resonant period and a resonant frequency. The resonant current transfers electric energy to the first terminal or the second terminal of the power conversion circuit 1b.

As shown in FIG. 2A, the power conversion circuit 2a has a symmetric circuit topology, in which the ratio of the input voltage to the output voltage is N:1. The power conversion circuit 2a includes two first switching units and a second switching unit. Each first switching unit includes a first switch group and a second switch group, which are electrically connected with each other. In one of the two first switching units, the first switch group includes a first switch S21, and the second switch group includes a fifth switch S22. In the other first switching unit, the first switch group includes a fourth switch S23, and the second switch group includes a second switch S24. The second switching unit includes a third switch group and a fourth switch group. The third switch group includes a third switch Sr22, and the fourth switch group includes a sixth switch Sr21. The first terminal of the first switch S21 is electrically connected with the first positive electrode V1+. The second terminal of the first switch S21 is electrically connected to the first terminal of the fifth switch S22. The second terminal of the fifth switch S22 is electrically connected with the first terminal of the sixth switch Sr21. The second terminal of the sixth switch Sr21 is electrically connected with the second negative electrode V2−. The first terminal of the fourth switch S23 is electrically connected with the first positive electrode V1+ and the first switch S21. The second terminal of the fourth switch S23 is electrically connected with the first terminal of the second switch S24. The second terminal of the second switch S24 is electrically connected with the first terminal of the third switch Sr22. The second terminal of the third switch Sr22 is electrically connected with the second negative electrode V2−. The first flying capacitor Cb21 is electrically connected between the second terminal of the first switch S21 and the first terminal of the third switch Sr22. The second flying capacitor Cb22 is electrically connected between the second terminal of the fourth switch S23 and the first terminal of the sixth switch Sr21.

The on/off states of the first switch S21, the second switch S24 and the sixth switch Sr21 are identical. The on/off states of the fourth switch S23, the fifth switch S22 the third switch Sr22 are identical. The phase difference between the control signals for controlling the on/off states of the first switch S21 and the fourth switch S23 is 180 degrees. The first capacitor C1 is electrically connected between the first positive electrode V1+ and the first negative electrode V1−. The second capacitor C2 is electrically connected between the second positive electrode V2+ and the second negative electrode V2−.

The magnetic element T-2a includes two first windings T21, T22 and two second windings T23, T24. These windings are wound around the same magnetic core to result in an electromagnetic coupling effect. The second terminals of the two first windings T21 and T22 (i.e., opposite-polarity terminals) are electrically connected with each other and further connected to the second positive electrode V2+. The first terminal of the first winding T21 is electrically connected with the second terminal of the fifth switch S22 and the first terminal of the sixth switch Sr21. The first terminal of the first winding T22 is electrically connected with the second terminal of the second switch S24 and the first terminal of the third switch Sr22. The serially-connected branch of the second winding T23 and the second flying capacitor Cb22 is connected between the second terminal of the fourth switch S23 and the second terminal of the fifth switch S22. The serially-connected branch of the second winding T24 and the first flying capacitor Cb21 is connected between the second terminal of the first switch S21 and the second terminal of the second switch S24. The turn ratio between t the second winding T23, the second winding T24, the first winding T21 and the first winding T22 is N:N:1:1, wherein N is a positive value, and preferably a positive integer. The ratio of the input voltage to the output voltage of the power conversion circuit 2a is N:1. As the switches in the power conversion circuit 2a are alternately turned on and off, the resonant effect between the first flying capacitor Cb21, the second flying capacitor Cb22 and the equivalent leakage inductor of the magnetic element T-2a generates a resonant current. The resonant current has a resonant period and a resonant frequency. The resonant current transfers electric energy to the first terminal or the second terminal of the power conversion circuit 2a.

In comparison with the embodiment of FIG. 2A, the magnetic element T-2b of the power conversion circuit 2b as shown in FIG. 2B includes two first windings T21 and T22. In addition, the two first windings T21 and T22 are wound around the same magnetic core to result in an electromagnetic coupling effect. The first winding T21 is electrically connected between the fifth switch S22 and the second positive electrode V2+. The first winding T22 is electrically connected between the second switch S24 and the second positive electrode V2+. The second terminal of the first winding T21 and the second terminal of the first winding T22 (i.e., opposite-polarity terminals) are electrically connected with each other and further connected to the second positive electrode V2+. The turn ratio between the first winding T21 and the first winding T22 is 1:1. The ratio of the input voltage to the output voltage of the power conversion circuit 2b is 4:1. As the switches in the power conversion circuit 2b are alternately turned on and off, the resonant effect between the first flying capacitor Cb21, the second flying capacitor Cb22 and the equivalent leakage inductor of the magnetic element T-2b generates a resonant current. The resonant current has a resonant period and a resonant frequency. The resonant current transfers electric energy to the first terminal or the second terminal of the power conversion circuit 2b.

As shown in FIG. 2C, the power conversion circuit 2c has a symmetric circuit topology, in which the ratio of the input voltage to the output voltage is 4:1. The power conversion circuit 2c includes two first switching units and a second switching unit. Each first switching unit includes a first switch group and a second switch group, which are electrically connected with each other. In one of the two first switching units, the first switch group includes a switch S21, and the second switch group includes two switches S22a and S22b. In the other first switching unit, the first switch group includes a switch S23, and the second switch group includes two switches S24a and S24b. The second switching unit includes a third switch group and a fourth switch group. The third switch group includes a switch Sr22, and the fourth switch group includes a switch Sr21. The first terminal of the switch S21 is electrically connected to the first positive electrode V1+. The second terminal of the switch S21 is electrically connected with the first terminal of the switch S22a. The second terminal of the switch S22a is electrically connected with the first terminal of the switch S24b. The second terminal of the switch S24b is electrically connected to the first terminal of switch Sr22. The second terminal of the switch Sr22 is electrically connected with the second negative electrode V2−. The first terminal of the switch S23 is electrically connected with the first positive electrode V1+ and the switch S21. The second terminal of the switch S23 is electrically connected with the first terminal of the switch S24a. The second terminal of the switch S24a is electrically connected with the first terminal of the switch S22b. The second terminal of switch S22b is electrically connected with the first terminal of the switch Sr21. The second terminal of the switch Sr21 is electrically connected with the second negative electrode V2−. The first flying capacitor Cb21 is electrically connected between the second terminal of the switch S21 and the first terminal of the switch Sr22. The second flying capacitor Cb22 is electrically connected between the second terminal of the switch S23 and the first terminal of the switch Sr21. The second terminal of the switch S22a is electrically connected with the second terminal of the switch S24a.

The on/off states of the switch S21, the switch S24a, the switch S24b and the switch Sr21 are identical. The on/off states of the switch S23, the switch S22a, the switch S22b and the switch Sr22 are identical. The phase difference between the control signals for controlling the on/off states of the switch S21 and the switch S23 is 180 degrees. The first capacitor C1 is electrically connected between the first positive electrode V1+ and the first negative electrode V1−. The second capacitor C2 is electrically connected between the second positive electrode V2+ and the second negative electrode V2−.

The magnetic element T-2c of the power conversion circuit 2c includes two first windings T21 and T22. In addition, the two first windings T21 and T22 are wound around the same magnetic core to result in an electromagnetic coupling effect. The second terminals of the two first windings T21 and T22 (i.e., opposite-polarity terminals) are electrically connected with each other and further connected to the second positive electrode V2+. The first terminal of the first winding T21 is electrically connected with the second terminal of the switch S22b and the first terminal of the switch Sr21. The first terminal of the first winding T22 is electrically connected with the second terminal of the switch S24b and the first terminal of the switch Sr22. The turn ratio between the first winding T21 and the first winding T22 is 1:1. The ratio of the input voltage to the output voltage of the power conversion circuit 2c is 4:1. As the switches in the power conversion circuit 2c are alternately turned on and off, the resonant effect between the first flying capacitor Cb21, the second flying capacitor Cb22 and the equivalent leakage inductor of the magnetic element T-2c generates a resonant current. The resonant current has a resonant period and a resonant frequency. The resonant current transfers electric energy to the first terminal or the second terminal of the power conversion circuit 2c.

In comparison with the embodiment of FIG. 2C, the magnetic element T-2d as shown in FIG. 2D further includes two second windings T23, T24. These windings are wound around the same magnetic core to result in an electromagnetic coupling effect. The second terminals of the two first windings T21 and T22 (i.e., opposite-polarity terminals) are electrically connected with each other and further connected to the second positive electrode V2+. The first terminal of the first winding T21 is electrically connected with the second terminal of the switch S22b and the first terminal of the switch Sr21. The first terminal of the first winding T22 is electrically connected with the second terminal of the switch S24*b* and the first terminal of the switch Sr22. The serially-connected branch of the second winding T23 and the second flying capacitor Cb22 is connected between the second terminal of the switch S23 and the second terminal of the switch S22*b*. The serially-connected branch of the second winding T24 and the first flying capacitor Cb21 is connected between the second terminal of the switch S21 and the second terminal of the switch S24*b*. The turn ratio between the second winding T23, the second winding T24, the first winding T21 and the first winding T22 is N:N:1:1, wherein N is a positive value, and preferably a positive integer. The ratio of the input voltage to the output voltage of the power conversion circuit 2*d* is N:1. As the switches in the power conversion circuit 2*d* are alternately turned on and off, the resonant effect between the first flying capacitor Cb21, the second flying capacitor Cb22 and the equivalent leakage inductor of the magnetic element T-2*d* generates a resonant current. The resonant current has a resonant period and a resonant frequency. The resonant current transfers electric energy to the first terminal or the second terminal of the power conversion circuit 2*d*.

Generally, the conventional power conversion circuit with resonant and duty-cycle-expandable circuit topology has a problem of controlling the power conversion circuit to start and pre-charging the flying capacitor. For overcoming the drawbacks of the conventional technology, the present invention further provides a power conversion system. The power conversion system includes a power conversion circuit and a start-up circuit. The power conversion circuit has the circuitry structure of any of the power conversion circuits 1*a*, 1*b*, 2*a*, 2*b*, 2*c* and 2*d*. The start-up circuit is used for pre-charging the flying capacitor and the output capacitor of the power conversion circuit.

Figure 3A:
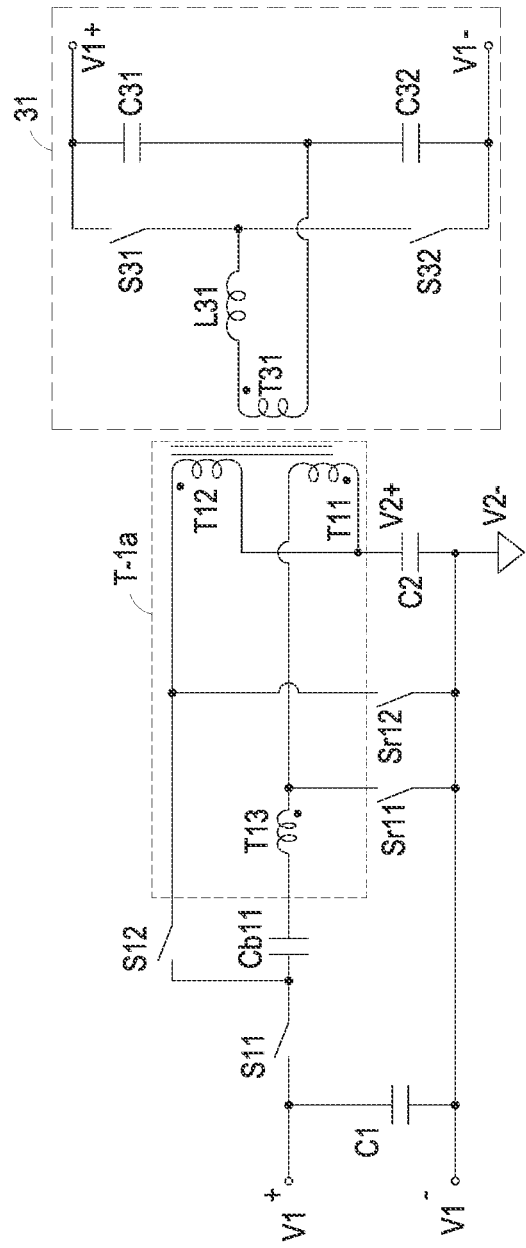
FIG. 3A is a schematic circuit diagram illustrating a power conversion system according to a first embodiment of the present invention.
Figure 3B:
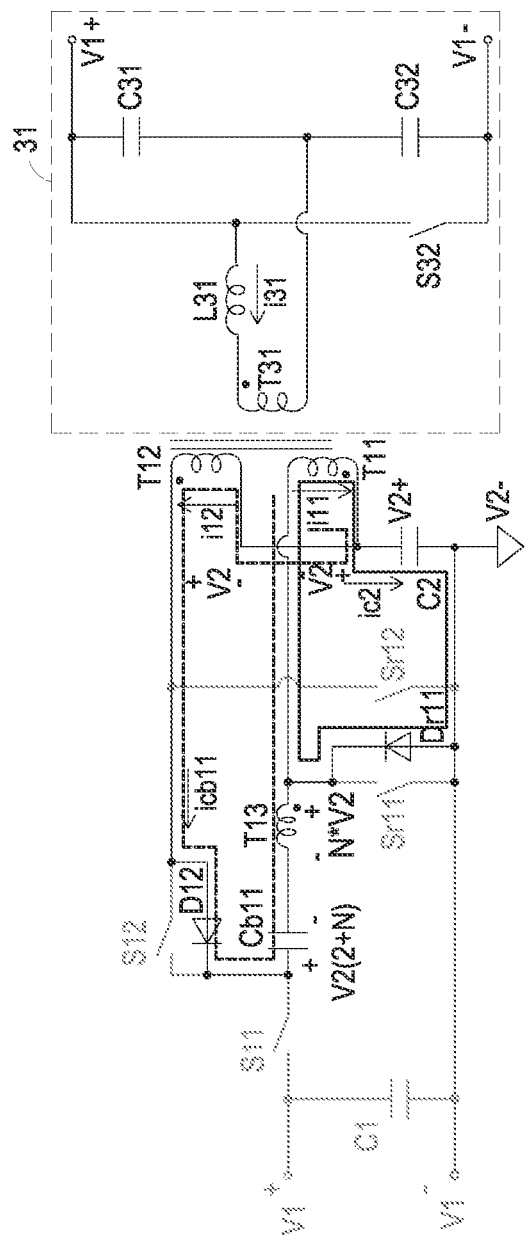
FIG. 3B is a schematic circuit diagram illustrating the operations of the power conversion system as shown in FIG. 3A when the flying capacitor and the second capacitor are pre-charged by the start-up circuit.
Figure 3C:
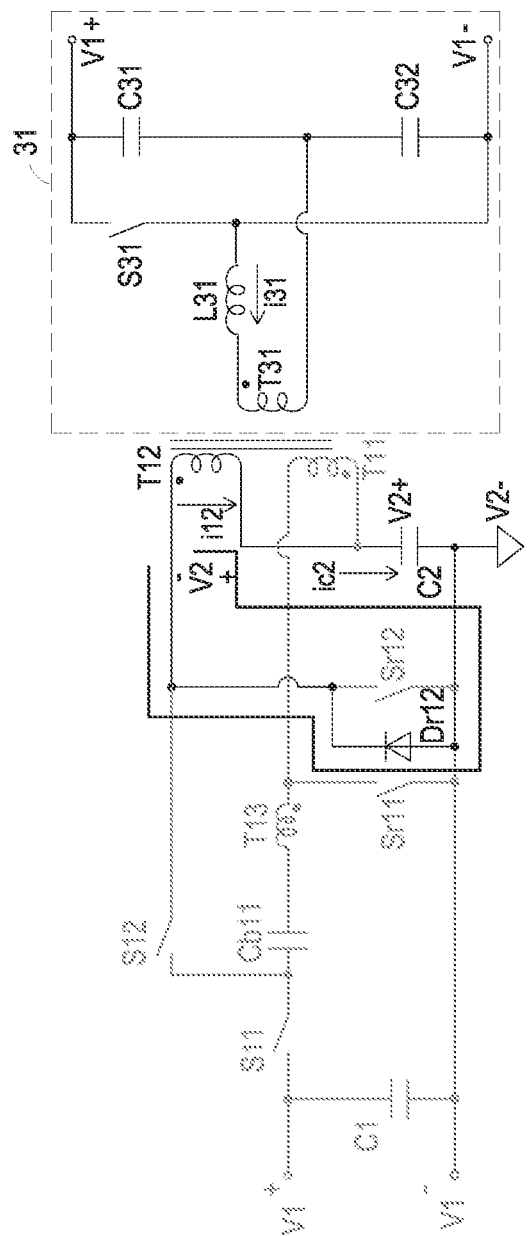
FIG. 3C is a schematic circuit diagram illustrating the operations of the power conversion system as shown in FIG. 3A when the second capacitor is pre-charged by the start-up circuit.
Figure 3D:
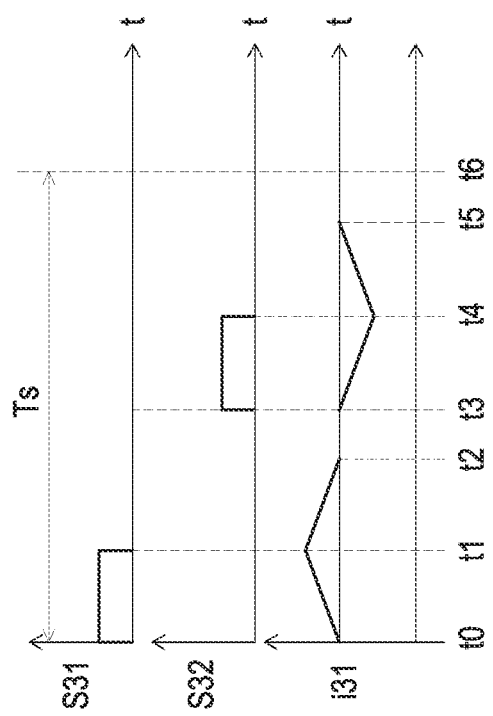
FIG. 3D is a schematic timing waveform diagram illustrating the on/off states of associated switches in the power conversion system of the first embodiment and associated current signals.

FIG. 3A is a schematic circuit diagram illustrating a power conversion system according to a first embodiment of the present invention. FIG. 3B is a schematic circuit diagram illustrating the operations of the power conversion system as shown in FIG. 3A when the flying capacitor and the second capacitor are pre-charged by the start-up circuit. FIG. 3C is a schematic circuit diagram illustrating the operations of the power conversion system as shown in FIG. 3A when the second capacitor is pre-charged by the start-up circuit. FIG. 3D is a schematic timing waveform diagram illustrating the on/off states of associated switches in the power conversion system of the first embodiment and associated current signals.

In this embodiment, the power conversion system 3 includes a power conversion circuit 1*a* and a start-up circuit 31. The circuitry structure of the power conversion circuit 1*a* is identical to that of FIG. 1A. The start-up circuit 31 includes a third winding T31, an inductor L31, a switch bridge arm and a capacitor bridge arm. The switch bridge arm includes an upper switch S31 and a lower switch S32, which are electrically connected with each other. The duty cycles of the control signals for controlling the upper switch S31 and the lower switch S32 are equal. The phase difference between the control signals for controlling the upper switch S31 and the lower switch S32 is 180 degrees. In addition, the control signals for controlling the upper switch S31 and the lower switch S32 are complementary to each other. The duty cycles of the two control signals are gradually increased from 0% to 50%. The capacitor bridge arm includes an upper capacitor C31 and a lower capacitor C32, which are electrically connected with each other. The capacitor bridge arm and the switch bridge arm are electrically connected with each other. Moreover, the capacitor bridge arm and the switch bridge arm are collaboratively formed as an input terminal of the start-up circuit 31, which is also referred as an input voltage terminal of the power conversion system 3. In this embodiment, the first terminal of the power conversion system 3 is the input voltage terminal, and the second terminal of the power conversion system 3 is an output voltage terminal. The input terminal of the start-up circuit 31 is electrically connected with the first positive electrode V1+ and the first negative electrode V1− of the first terminal of the power conversion system 3. The third winding T31 is electromagnetically coupled with the two first windings T11, T12 and the second winding T13. The first terminal of the serially-connected branch of the third winding T31 and the inductor L31 is connected with the midpoint of the switch bridge arm, i.e., the node between the upper switch S31 and the lower switch S32. The second terminal of the serially-connected branch of the third winding T31 and the inductor L31 is connected with the midpoint of the capacitor bridge arm, i.e., the node between the upper capacitor C31 and the lower capacitor C32. Consequently, the voltage across the first terminal and the second terminal of the serially-connected branch of the third winding T31 and the inductor L31 is an alternating voltage.

In an embodiment, the inductor L31 is an external inductor. Alternatively, in another embodiment, the inductor L31 is a leakage inductor that is electromagnetically coupled with the two first windings T11, T12, the second winding T13 and the third winding T31. The first capacitor C1 or the second capacitor C2 is served as an output capacitor of the power conversion system 3. That is, the output capacitor of the power conversion system 3 is electrically connected with the first terminal or the second terminal of the power conversion system 3.

The operations of the start-up circuit 31 as shown in FIG. 3A will be described as follows.

Please refer to FIGS. 3B and 3D. At the time point t0, the upper switch S31 is turned on, and the lower switch S32 is turned off. In addition, the current i31 in the start-up circuit 31 flows through the upper switch S31, the inductor L31, the third winding T31 and the lower capacitor C32. In the time interval between the time point t0 and the time point t1, the current i31 rises linearly. At this time, the parasitic diode Dr11 of the third switch Sr11 is turned on, and the terminal voltage of the first winding T11 is clamped to the voltage (e.g., V2) of the second terminal of the power conversion system 3 through the conduction of the parasitic diode Dr11. Due to the electromagnetic coupling effect of the first winding T11 and the third winding T31, the second capacitor C2 is charged. Moreover, since the first winding T11, the first winding T12 and the second winding T13 are electromagnetically coupled with each other, the terminal voltage of the first winding T12 is also V2. The terminal voltage across the two terminals of the second winding T13 is equal to N×V2. The flying capacitor Cb11 is pre-charged by the first winding T11, the first winding T12 and the second winding T13 through the parasitic diode D12 of the second switch S12. The terminal voltage across the two terminals of the flying capacitor Cb11 is equal to (2+N)×V2. At the time point t1, the upper switch S31 is turned off, and the current i31 flows through the parasitic diode (not shown) of the lower switch S32 and the lower capacitor C32. The third winding T31 is in a freewheeling state. At this time, the flying capacitor Cb11 is still pre-charged by the first winding T11, the first winding T12 and the second winding T13 through the parasitic diode D12 of the second switch S12.

Please refer to FIGS. 3C and 3D. At the time point t3, the lower switch S32 is turned on, and the current i31 in the start-up circuit 31 flows through the upper capacitor C31, the third winding T31, the inductor L31 and the lower switch S32. In the time interval between the time point t3 and the time point t4, the current i31 rises linearly along the reverse direction. At this time, the parasitic diode Dr12 of the fourth switch Sr12 is turned on, and the terminal voltage of the first winding T12 is clamped to V2 through the conduction of the parasitic diode Dr12. Due to the electromagnetic coupling effect of the first winding T12 and the third winding T31, the second capacitor C2 is charged. At the time point t4, the lower switch S32 is turned off, and the current i31 flows through the parasitic diode (not shown) of the upper switch S31 and the upper capacitor C31. The third winding T31 is in a freewheeling state. At this time, the second capacitor C2 is charged through the electromagnetic coupling effect of the first winding T12 and the third winding T31.

In an embodiment, during the process of starting up the power conversion circuit 1a, the first switch S11 of the first switching unit is in the off state. The alternating voltage on the third winding T31 of the start-up circuit 31 and the parasitic diodes of the corresponding switches are used. Consequently, the terminal voltage of the flying capacitor Cb11 and the terminal voltage of the second capacitor C2 are charged up to a preset voltage. For example, after the terminal voltage of the flying capacitor Cb11 and the terminal voltage of the second capacitor C2 are charged to a steady state of the power conversion circuit 1a, the start-up process of the power conversion system 3 is completed. At the same time, the on/off state of the at least one switch in the first switch unit and the second switch unit of the power conversion circuit is switched. Consequently, the electronic components in the power conversion system 3 (e.g., switches) will not be suffered from the impact of the large current, and the possibility of causing the damage of the electronic components is largely reduced. Moreover, the cost-effective electronic components can be employed.

In another embodiment, during the process of starting up the power conversion circuit 1a, the first switch S11 of the first switching unit is in the off state. The alternating voltage on the third winding T31 of the start-up circuit 31 is used, and the corresponding switches of the power conversion circuit are selectively in the on state or the off state. Consequently, the terminal voltage of the flying capacitor Cb11 and the terminal voltage of the second capacitor C2 are charged up to the preset voltage.

In another embodiment, the start-up process of the power conversion system 3 is completed when the terminal voltage of the flying capacitor Cb11 is pre-charged to a voltage which is equal to or higher than 70% of the steady state voltage of the flying capacitor Cb11 and the terminal voltage of the output capacitor is pre-charged to a voltage which is equal to or higher than 70% of the steady state output voltage. At the same time, the on/off state of the at least one switch in the first switch unit and the second switch unit of the power conversion circuit is switched.

The start-up circuit 31 is also applicable to the power conversion circuit 1b as shown in FIG. 1B. In comparison with the embodiment of the power conversion circuit 1a as shown in FIG. 1A, the power conversion circuit 1b as shown in FIG. 1B omits the second winding T13. Consequently, the ratio of the input voltage to the output voltage of the power conversion circuit 1b is 4:1. The principles of charging the flying capacitor Cb11 and the second capacitor C2 of the power conversion circuit 1b through the start-up circuit 31 are similar to the principles of charging the power conversion circuit 1a and are not redundantly described herein.

Figure 4A:
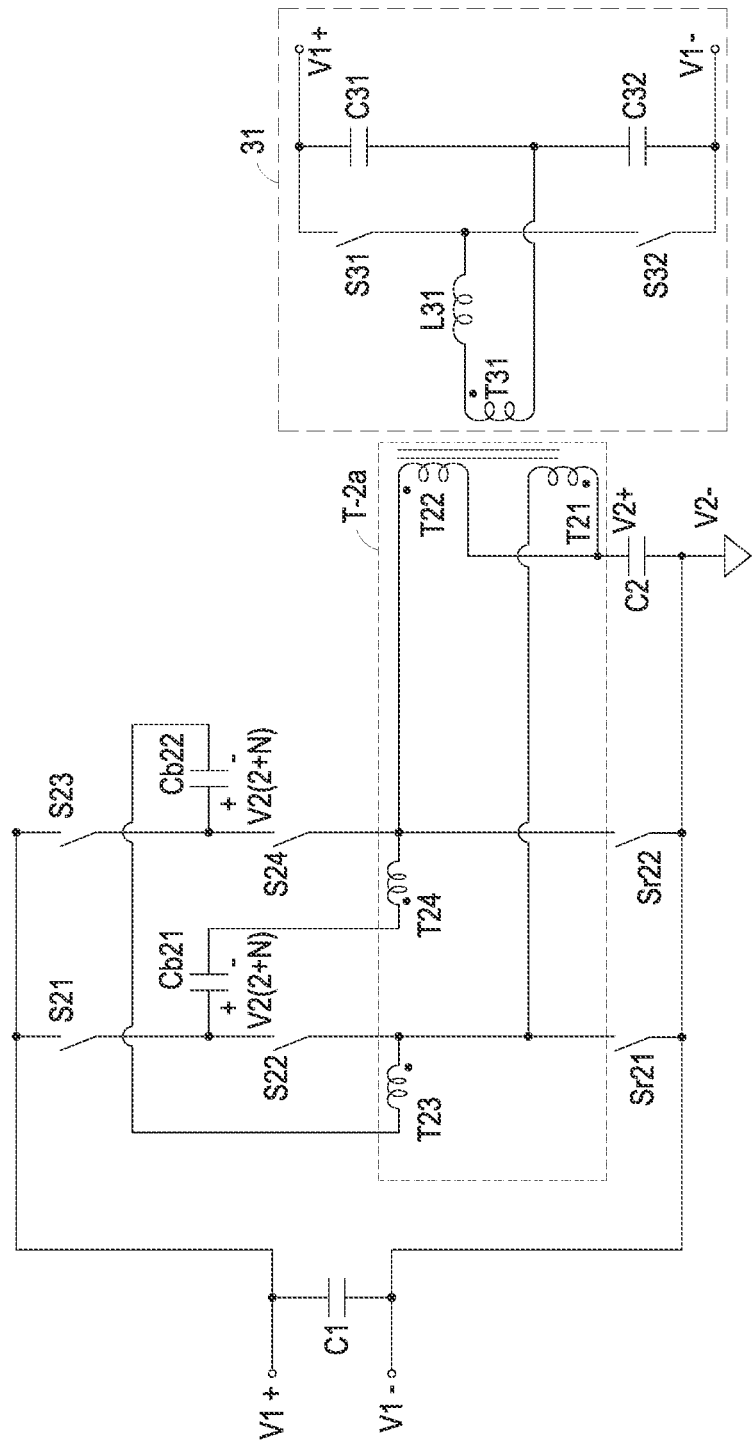
FIG. 4A is a schematic circuit diagram illustrating a power conversion system according to a second embodiment of the present invention.
Figure 4B:
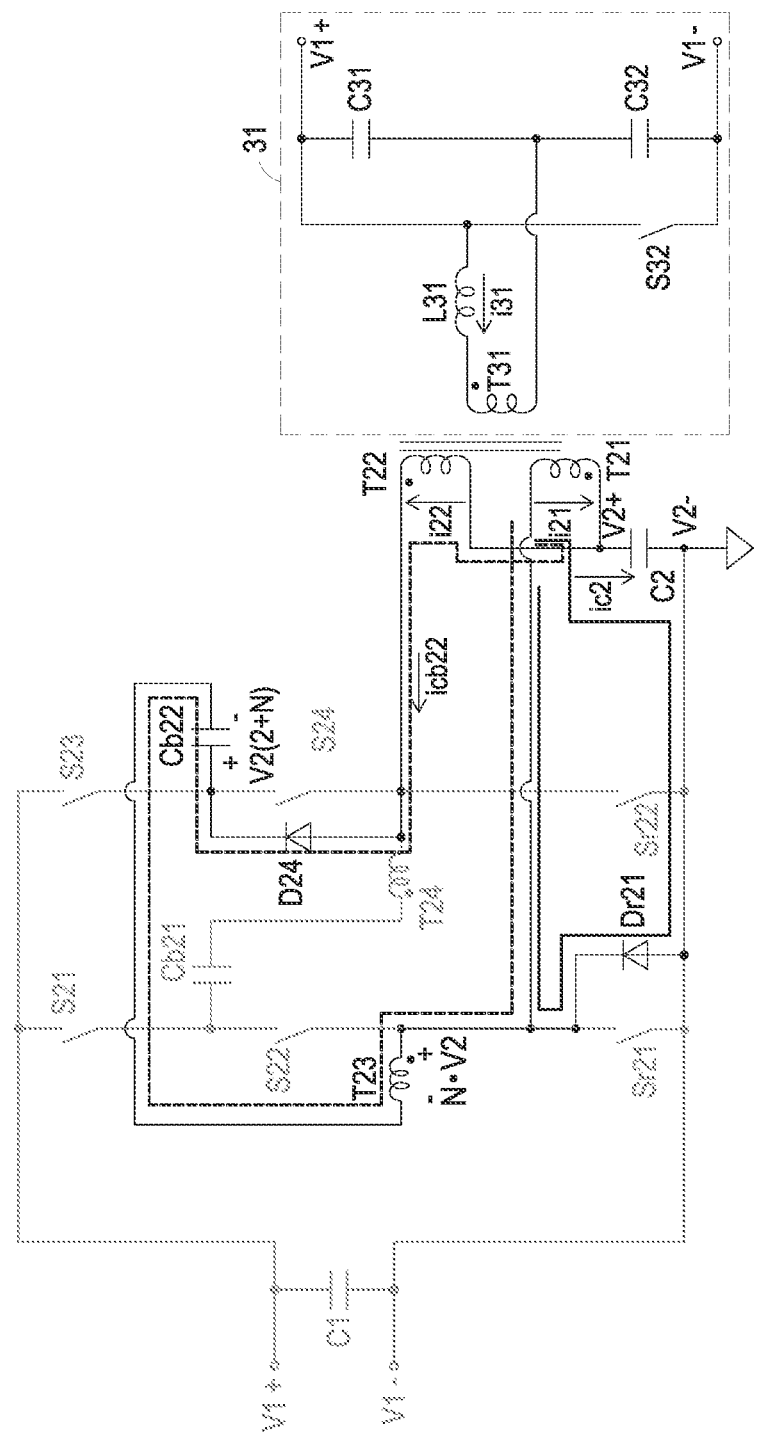
FIG. 4B is a schematic circuit diagram illustrating the operations of the power conversion system as shown in FIG. 4A when the flying capacitor and the second capacitor are pre-charged by the start-up circuit.
Figure 4C:
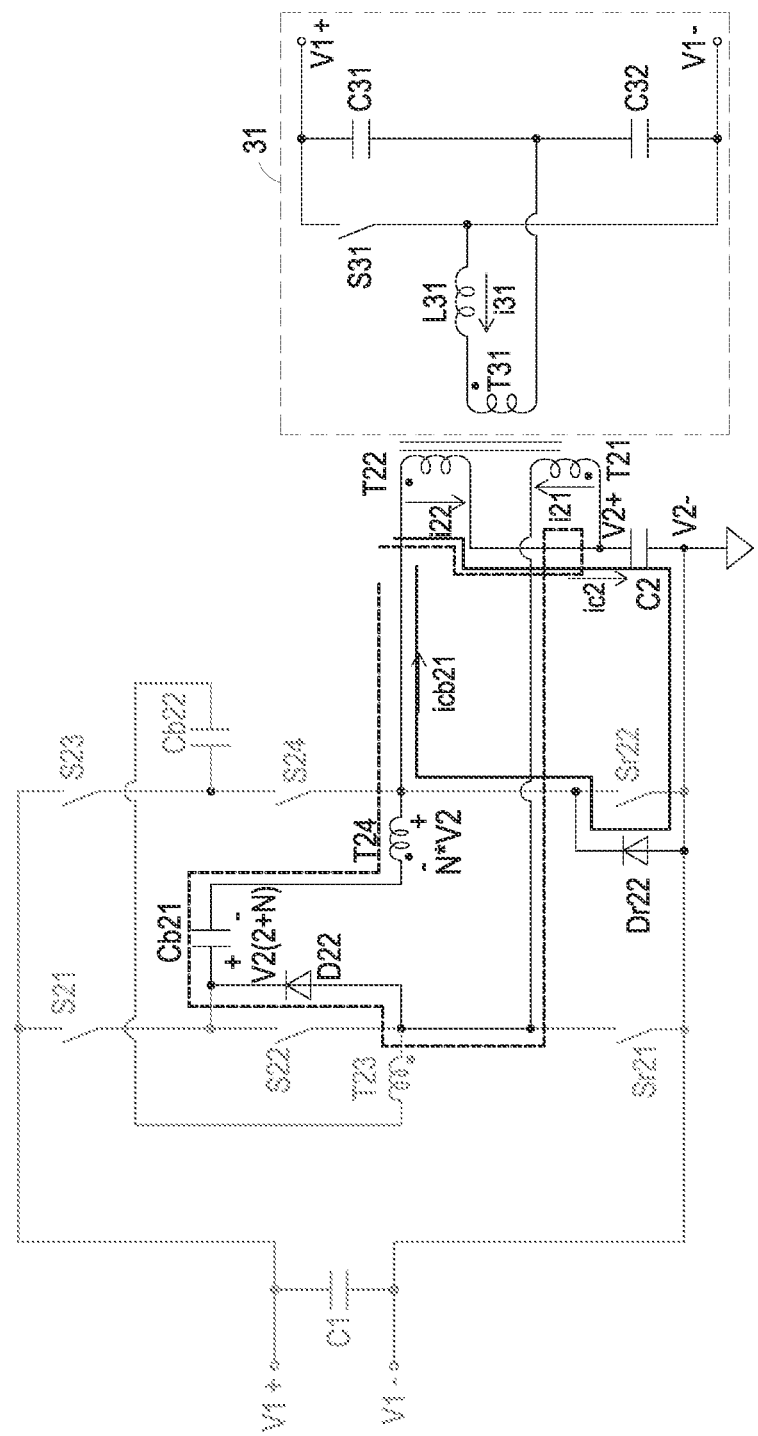
FIG. 4C is a schematic circuit diagram illustrating the operations of the power conversion system as shown in FIG. 4A when the flying capacitor and the second capacitor are pre-charged by the start-up circuit.

FIG. 4A is a schematic circuit diagram illustrating a power conversion system according to a second embodiment of the present invention. FIG. 4B is a schematic circuit diagram illustrating the operations of the power conversion system as shown in FIG. 4A when the flying capacitor and the second capacitor are pre-charged by the start-up circuit. FIG. 4C is a schematic circuit diagram illustrating the operations of the power conversion system as shown in FIG. 4A when the flying capacitor and the second capacitor are pre-charged by the start-up circuit. In this embodiment, the power conversion system 4 includes a power conversion circuit 2a and a start-up circuit 31. The circuitry structure of the power conversion circuit 2a is identical to that of FIG. 2A, and the circuitry structure and operations of the start-up circuit 31 are identical to that of FIG. 3A. The third winding T31 is electromagnetically coupled with the two first windings T21, T22 and the two second windings T23, T24. In this embodiment, the first terminal of the power conversion system 4 is the input voltage terminal, and the second terminal of the power conversion system 4 is an output voltage terminal. The input terminal of the start-up circuit 31 is electrically connected with the first positive electrode V1+ and the first negative electrode V1− of the first terminal of the power conversion system 4. Alternatively, in another embodiment, the inductor L31 is a leakage inductor that is electromagnetically coupled with the two first windings T21, T22, the two second windings T23, T24 and the third winding T31.

The operations of the start-up circuit 31 as shown in FIG. 4A will be described as follows.

Please refer to FIGS. 4B and 3D. At the time point t0, the upper switch S31 is turned on, and the lower switch S32 is turned off. In addition, the current i31 in the start-up circuit 31 flows through the upper switch S31, the inductor L31, the third winding T31 and the lower capacitor C32. In the time interval between the time point t0 and the time point t1, the current i31 rises linearly. At this time, the parasitic diode Dr21 of the sixth switch Sr21 is turned on, and the terminal voltage of the first winding T21 is clamped to the voltage (e.g., V2) of the second terminal of the power conversion system 4 through the conduction of the parasitic diode Dr21. Due to the electromagnetic coupling effect of the first winding T21 and the third winding T31, the second capacitor C2 is charged. Moreover, since the two first windings T21, T22 and the two second windings T23, T24 are electromagnetically coupled with each other, the terminal voltage of the first winding T22 is also V2. The terminal voltage across the two terminals of the second winding T23 is equal to N×V2. The second flying capacitor Cb22 is pre-charged by the two first windings T21, T22 and the two second windings T23, T24 through the parasitic diode D24 of the second switch S24. The terminal voltage across the two terminals of the first flying capacitor Cb21 is equal to (2+N)×V2. At the time point t1, the upper switch S31 is turned off, and the current i31 flows through the parasitic diode (not shown) of the lower switch S32 and the lower capacitor C32. The third winding T31 is in a freewheeling state.

Please refer to FIGS. 4C and 3D. At the time point t3, the lower switch S32 is turned on, and the current i31 in the start-up circuit 31 flows through the upper capacitor C31, the third winding T31, the inductor L31 and the lower switch S32. In the time interval between the time point t3 and the time point t4, the current i31 rises linearly along the reverse direction. At this time, the parasitic diode Dr22 of the third switch Sr22 is turned on, and the terminal voltage of the first winding T22 is clamped to V2 through the conduction of the parasitic diode Dr22. Due to the electromagnetic coupling effect of the first winding T22 and the third winding T31, the second capacitor C2 is charged. Moreover, since the two first windings T21, T22 and the two second windings T23, T24 are electromagnetically coupled with each other, the terminal voltage of the first winding T21 is also V2. The terminal voltage across the two terminals of the second winding T24 is equal to N×V2. The first flying capacitor Cb21 is pre-charged by the two first windings T21, T22 and the two second windings T23, T24 through the parasitic diode D22 of the fifth switch S22. At the time point t4, the lower switch S32 is turned off, and the current i31 flows through the parasitic diode (not shown) of the upper switch S31 and the upper capacitor C31. The third winding T31 is in a free-wheeling state.

In an embodiment, during the process of starting up the power conversion circuit 2a, the first switch S21 and the fourth switch S23 are in the off state. The alternating voltage on the third winding T3 of the start-up circuit 31 and the parasitic diodes of the corresponding switches are used. Consequently, the terminal voltages of the first flying capacitor Cb21, the second flying capacitors Cb22 and the second capacitor C2 are charged up to a preset voltage. For example, the preset voltage is a steady state voltage of the power conversion circuit 2a. When the preset voltage is achieved, the start-up process of the power conversion system 4 is completed. At the same time, the on/off state of the at least one switch in the first switch unit and the second switch unit in the power conversion circuit 2a is switched. Consequently, the electronic components in the power conversion system 4 (e.g., switches) will not be suffered from the impact of the large current, and the possibility of causing the damage of the electronic components is largely reduced. Moreover, the cost-effective electronic components can be employed.

In another embodiment, during the process of starting up the power conversion circuit 2a, the first switch S21 and the fourth switch S23 are in the off state. The alternating voltage on the third winding T3 of the start-up circuit 31 is used, and the corresponding switches of the power conversion circuit are selectively in the on state or the off state. Consequently, the terminal voltages of the first flying capacitor Cb21, the second flying capacitors Cb22 and the second capacitor C2 are charged up to the preset voltage.

In another embodiment, the start-up process of the power conversion system 4 is completed when the terminal voltage of each flying capacitor is pre-charged to a voltage which is equal to or higher than 70% of the steady state voltage of the corresponding flying capacitor and the terminal voltage of the output capacitor is pre-charged to a voltage which is equal to or higher than 70% of the steady state output voltage. At the same time, the on/off state of the at least one switch in the first switch unit and the second switch unit in the power conversion circuit 2a is switched.

The start-up circuit 31 is also applicable to the power conversion circuit 2b as shown in FIG. 2B. In comparison with the embodiment of the power conversion circuit 2a as shown in FIG. 2A, the power conversion circuit 2b as shown in FIG. 2B omits the two second windings T23, T24. Consequently, the ratio of the input voltage to the output voltage of the power conversion circuit 2b is 4:1. The principles of charging the first flying capacitor Cb21, the second flying capacitors Cb22 and the second capacitor C2 of the power conversion circuit 2b through the start-up circuit 31 are similar to the principles of charging the power conversion circuit 2a and are not redundantly described herein.

Figure 5A:
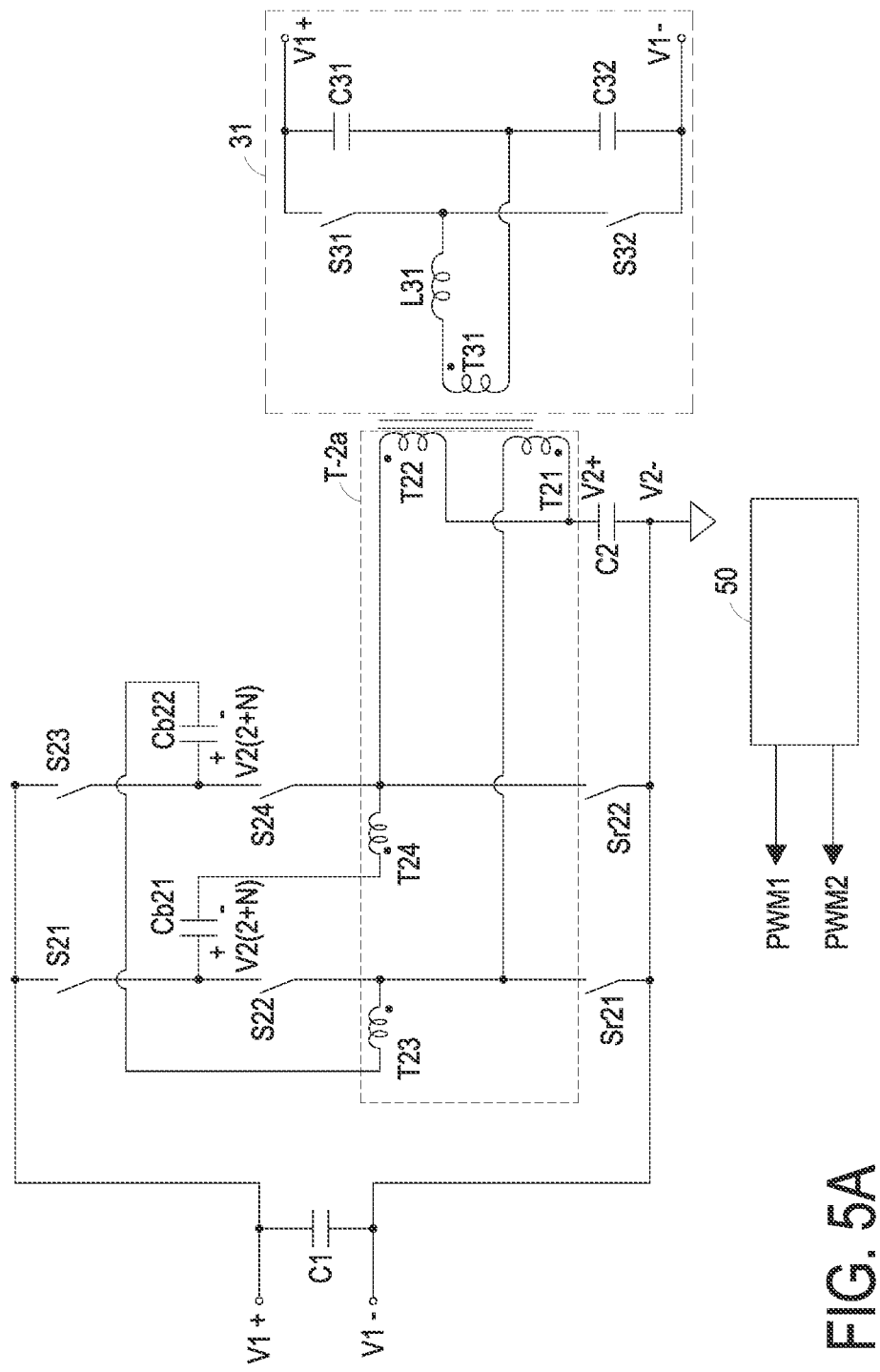
FIG. 5A is a schematic circuit diagram illustrating a power conversion system according to a third embodiment of the present invention.
Figure 5B:
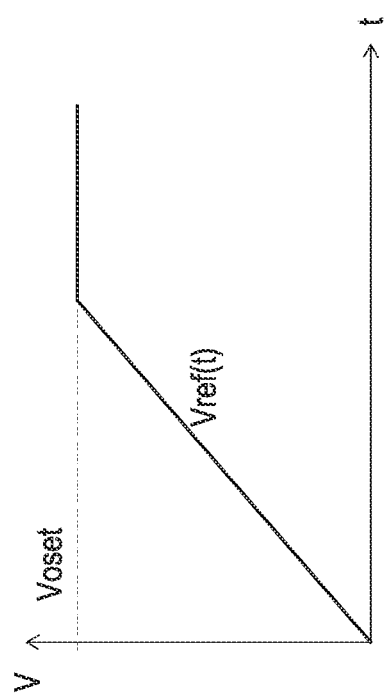
FIG. 5B schematically illustrates the change of a reference voltage for a control circuit of the power conversion system as shown in FIG. 5A.

In some embodiments, the power conversion system 3 as shown in FIG. 3A and the power conversion system 4 as shown in FIG. 4A further includes a control circuit. Please refer to FIGS. 5A and 5B. FIG. 5A is a schematic circuit diagram illustrating a power conversion system according to a third embodiment of the present invention. FIG. 5B schematically illustrates the change of a reference voltage for a control circuit of the power conversion system as shown in FIG. 5A. In this embodiment, the power conversion system 5 includes a power conversion circuit 2a, a start-up circuit 31 and a control circuit 50. The circuitry structure of the power conversion circuit 2a is identical to that of FIG. 4A, and the circuitry structure of the start-up circuit 31 is identical to that of FIG. 4A. The control circuit 50 issues two control signals PWM1 and PWM2. The upper switch S31 of the start-up circuit 31 is controlled according to the control signal PWM1. The lower switch S32 of the start-up circuit 31 is controlled according to the control signal PWM2. Consequently, the voltage across the first terminal and the second terminal of the serially-connected branch of the third winding T31 and the inductor L31 is an alternating voltage.

In an embodiment, the duty cycles of the control signals PWM1 and PWM2 are identical, and the phase difference between the two control signals PWM1 and PWM2 is 180 degrees. It is noted that numerous modifications and alterations may be made while retaining the teachings of the invention. For example, in another embodiment, the duty cycles of the control signals PWM1 and PWM2 are different and lower than 50%. The phase difference between the two control signals PWM1 and PWM2 may be varied according to the practical requirements as long as the voltage across the first terminal and the second terminal of the serially-connected branch of the third winding T31 and the inductor L31 is an alternating voltage. The control signals PWM1 and PWM2 for controlling the upper switch S31 and the lower switch S32 may be complementary to each other. Moreover, the duty cycles of the two control signals PWM1 and PWM2 may be gradually increased from zero to 50%.

The control circuit 50 can sample the voltage of the output voltage terminal of the power conversion system 5 and adjust the duty cycles of the two control signals PWM1 and PWM2 according to the sampling result. Alternatively, the control circuit 50 determines that the start-up process of the power conversion system 5 is completed according to the sampling result. When the start-up process of the power conversion system 5 is completed, the on/off state of the at least one switch in the first switch unit and the second switch unit of the power conversion circuit is switched. Moreover, a reference voltage signal Vref(t) is preset in the control circuit 50. The control signals PWM1 and PWM2 are adjusted according to the result of comparing the sampled voltage of the output voltage terminal with the reference voltage signal Vref(t). Consequently, the duty cycles of the two control signals PWM1 and PWM2 can be gradually increased from zero to 50%. That is, the maximum duty cycle is 50%. As the output voltage terminal of the power conversion system 5, the first flying capacitor Cb21 and the second flying capacitors Cb22 are pre-charged, the output voltage of the power conversion system 5 is gradually increased from the preset reference voltage signal Vref(t). Consequently, the soft-start function of the power conversion system 5 is achieved. When the voltage at the output voltage terminal of the power conversion system 5 is equal to the steady state voltage, i.e., the preset reference voltage Voset as shown in FIG. 5B, the start-up process of the power conversion system 5 is completed. When the start-up process of the power conversion system 5 is completed, the on/off state of the at least one switch in the first switch unit and the second switch unit of the power conversion circuit is switched.

In another embodiment, the control circuit 50 does not sample the output voltage of the power conversion system 5. Moreover, the duty cycles of the control signals PWM1 and PWM2 from control circuit 50 are fixed. The upper switch S31 and the lower switch S32 are controlled according to the control signals PWM1 and PWM2, respectively. The maximum duty cycle is 50%. Consequently, the first flying capacitor Cb21 and the second flying capacitors Cb22 are pre-charged, and the output voltage of the power conversion system 5 is increased. When the voltage at the output voltage terminal of the power conversion system 5 is equal to the steady state voltage, i.e., the preset reference voltage Voset, the start-up process of the power conversion system 5 is completed. When the start-up process of the power conversion system 5 is completed, the on/off state of the at least one switch in the first switch unit and the second switch unit of the power conversion circuit is switched.

Please refer to the power conversion circuit 2a as shown in FIG. 2A. When the terminal voltage of the second capacitor C2 is charged to Vin/(4+2N) and the terminal voltage of the first flying capacitor Cb21 is charged to Vin×(2+2N)/(4+2N), the parasitic diode of the first switch S21 is turned on. Moreover, since the input voltage Vin is used to clamp the terminal voltages of the second capacitor C2 and the first flying capacitor Cb21, the terminal voltages are not increased continuously. When the terminal voltage of the second capacitor C2 is charged to Vin/(4+2N) and the terminal voltage of the second flying capacitor Cb22 is charged to Vin×(2+2N)/(4+2N), the parasitic diode of the fourth switch S23 is turned on. Moreover, since the input voltage Vin is used to clamp the terminal voltages of the second capacitor C2 and the second flying capacitor Cb22, the terminal voltages are not increased continuously. Meanwhile, the start-up process of the power conversion system is completed, and the on/off state of the at least one switch in the first switch unit and the second switch unit of the power conversion circuit is switched.

Please refer to the power conversion circuit 2b as shown in FIG. 2B. When the terminal voltage of the second capacitor C2 is charged to Vin/4 and the terminal voltage of the first flying capacitor Cb21 is charged to Vin/2, the parasitic diode of the first switch S21 is turned on. Moreover, the input voltage Vin is used to clamp the terminal voltages of the second capacitor C2 and the first flying capacitor Cb21. When the terminal voltage of the second capacitor C2 is charged to Vin/4 and the terminal voltage of the second flying capacitor Cb22 is charged to Vin/2, the parasitic diode of the third switch S23 is turned on. Moreover, since the input voltage Vin is used to clamp the terminal voltages of the second capacitor C2 and the second flying capacitor Cb22, the terminal voltages are not increased continuously. Meanwhile, the start-up process of the power conversion system is completed, and the on/off state of the at least one switch in the first switch unit and the second switch unit of the power conversion circuit is switched.

The control circuit may be applied to the power conversion circuits as shown in FIGS. 1A and 1B. Similarly, the duty cycles of the control signals PWM1 and PWM2 from control circuit 50 are fixed. The operations of the control circuit are similar to those for the power conversion circuits as shown in FIGS. 1A and 1B, and are not redundantly described herein.

In an embodiment, the preset reference voltage Voset is 70% of the steady state voltage of the power conversion system 5. Alternatively, the preset reference voltage Voset is in the range between 70% of the steady state voltage of the power conversion system 5 and the steady state voltage of the power conversion system 5. In another embodiment, the start-up process of the power conversion system 5 is completed when the terminal voltage of each flying capacitor is pre-charged to a voltage which is equal to or higher than 70% of the steady state voltage of the corresponding flying capacitor and the terminal voltage of the output capacitor is pre-charged to a voltage which is equal to or higher than 70% of the steady state output voltage. At the same time, the on/off state of the at least one switch in the first switch unit and the second switch unit of the power conversion circuit is switched.

By adjusting the switching frequency of the control signals PWM1 and PWM2, the inductance of the inductor L31, the capacitance of the upper capacitor C31 and the capacitance of the lower capacitor C32, the resonant effect between the inductor L31, the upper capacitor C31 and the lower capacitor C32 occurs. The resonant frequency is nearly equal to the switching frequency or much higher than the switching frequency.

Figure 6A:
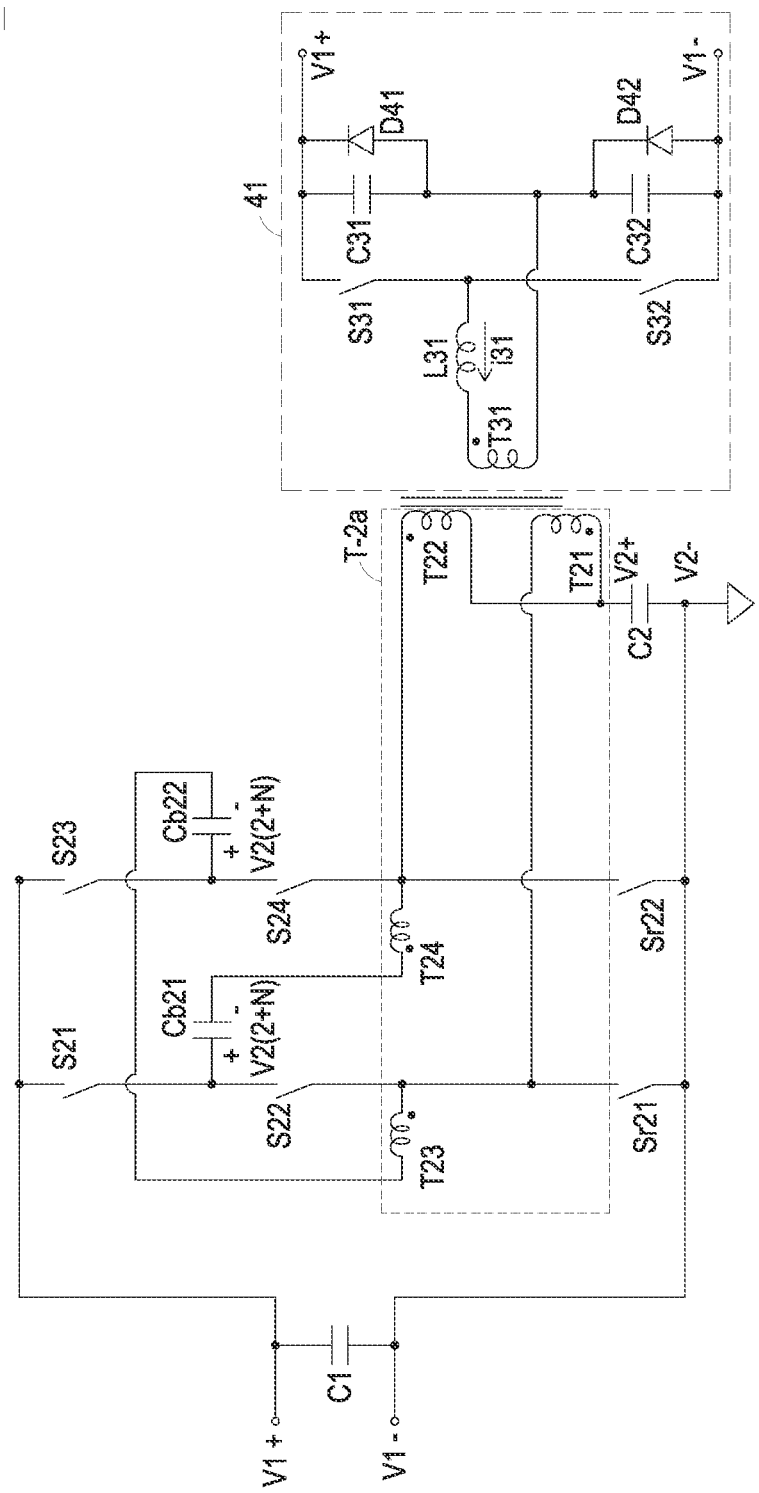
FIG. 6A is a schematic circuit diagram illustrating a power conversion system according to a fourth embodiment of the present invention.
Figure 6C:
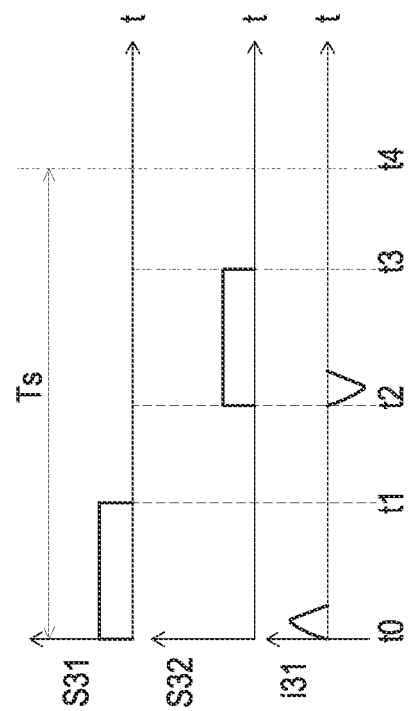
FIG. 6C is a schematic timing waveform diagram illustrating another example of the on/off states of associated switches and associated current signals.
Figure 6B:
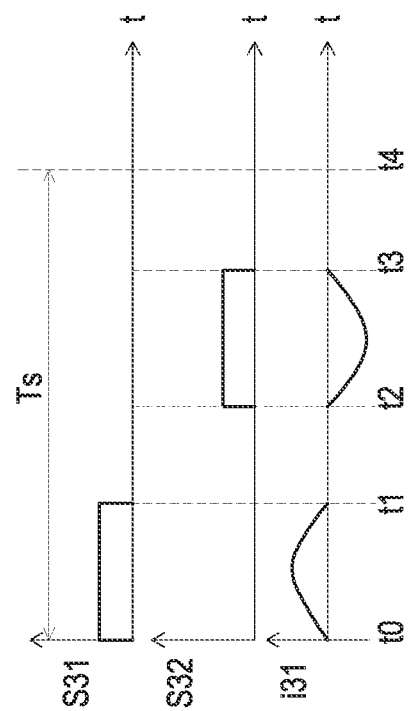
FIG. 6B is a schematic timing waveform diagram illustrating an example of the on/off states of associated switches and associated current signals.

FIG. 6A is a schematic circuit diagram illustrating a power conversion system according to a fourth embodiment of the present invention. FIG. 6B is a schematic timing waveform diagram illustrating an example of the on/off states of associated switches and associated current signals. FIG. 6C is a schematic timing waveform diagram illustrating another example of the on/off states of associated switches and associated current signals. In this embodiment, the power conversion system 6 includes a power conversion circuit 2a and a start-up circuit 41. The circuitry structure of the power conversion circuit 2a is identical to that of FIG. 2A. In comparison with the power conversion system of FIG. 4A, the start-up circuit 41 of the power conversion system 6 of this embodiment is distinguished. In this embodiment, the start-up circuit 41 further includes at least a first clamp diode D41 and a second clamp diode D42. The first clamp diode D41 and the upper capacitor C31 are connected with each other in parallel. That is, the cathode of the first clamp diode D41 is electrically connected with the first terminal of the upper capacitor C31 and the positive input terminal of the start-up circuit 41, and the anode of the first clamp diode D41 is electrically connected with the second terminal of the upper capacitor C31 and the first terminal of the lower capacitor C32. The second clamp diode D42 is electrically connected with the lower capacitor C32 in parallel. That is, the cathode of the second clamp diode D42 is electrically connected with the first terminal of the lower capacitor C32 and the second terminal of the upper capacitor C31, and the anode of the second clamp diode D42 is electrically connected with the negative input terminal of the start-up circuit 31.

Please refer to FIG. 6B. In the interval between the time point t0 and the time point t1 and in the time interval between the time point t2 and the time point t3, the inductor L31, the upper capacitor C31 and the lower capacitor C32 generate a resonant current i31. Consequently, the second capacitor C2, the first flying capacitor C21 and the second flying capacitor C22 are charged. The resonant frequency of the resonant current i31 is close to the switching frequency of the control signal received by the start-up circuit 41. In addition, the voltages of the upper capacitor C31 and the lower capacitor C32 are clamped by the first clamp diode D41 and the second clamp diode D42, respectively. Consequently, the upper capacitor C31 and the lower capacitor C32 can be protected.

In case that the inductance of the inductor L31 and the capacitances of the upper capacitor C31 and the lower capacitor C32, the resonant frequency of the resonant current i31 is increased. Consequently, the resonant frequency is much larger than the switching frequency of the start-up circuit 41. For example, the resonant frequency is greater than 10 times the switching frequency of the start-up circuit 41. The waveform of the resonant current i31 is shown in FIG. 6C. Consequently, the voltage across the first terminal and the second terminal of the serially-connected branch of the third winding T31 and the inductor L31 is an alternating voltage. In addition, the flying capacitors and the output capacitor are pre-charged through the electromagnetic coupling effect between the first windings, the second windings and the third winding.

It is noted that numerous modifications and alterations may be made while retaining the teachings of the invention. For example, the capacitor bridge arm in the start-up circuit 31 as shown in FIG. 3A, 4A or 5A is replaced by another switch bridge arm.

Figure 7A:
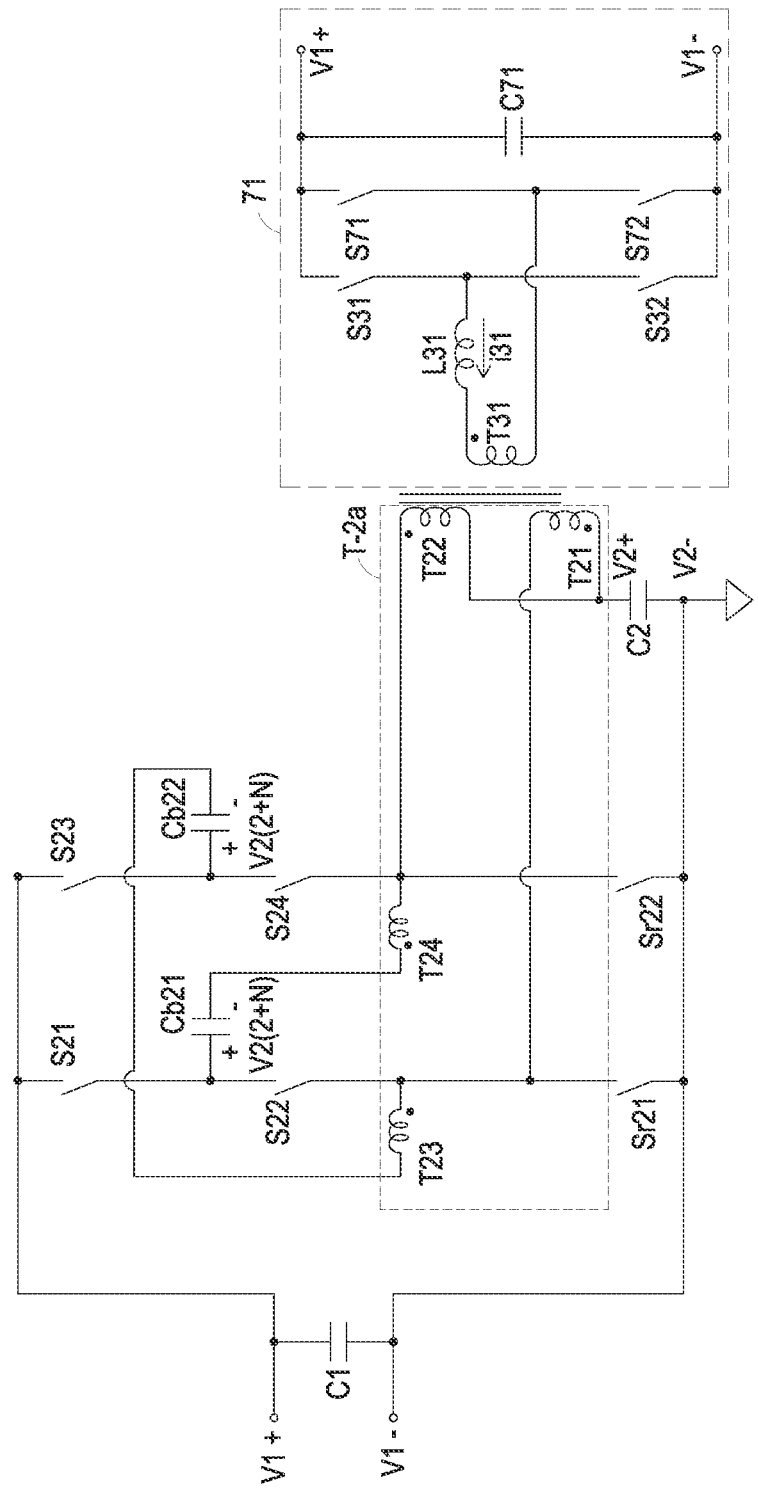
FIG. 7A is a schematic circuit diagram illustrating a power conversion system according to a fifth embodiment of the present invention.
Figure 7C:
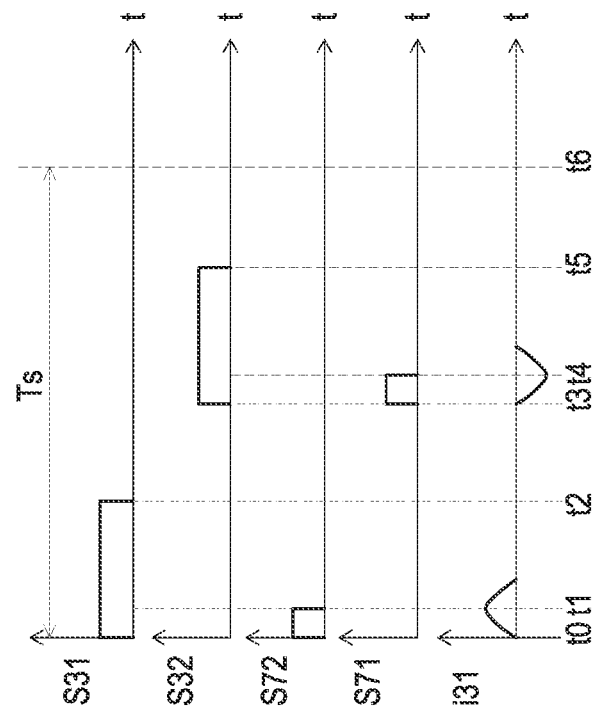
FIG. 7C is a schematic timing waveform diagram illustrating another example of the on/off states of associated switches and associated current signals.
Figure 7B:
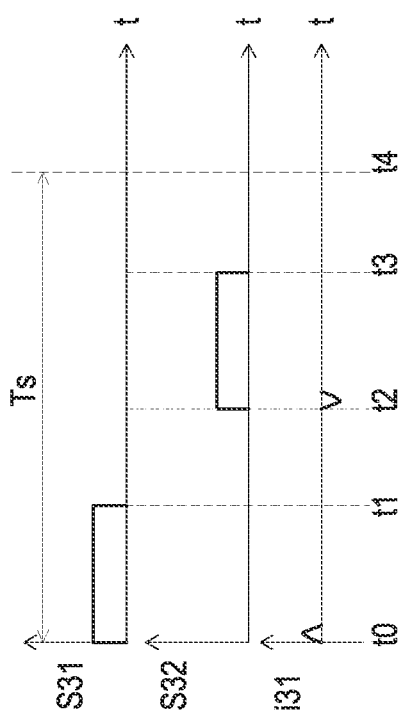
FIG. 7B is a schematic timing waveform diagram illustrating an example of the on/off states of associated switches and associated current signals.

FIG. 7A is a schematic circuit diagram illustrating a power conversion system according to a fifth embodiment of the present invention. FIG. 7B is a schematic timing waveform diagram illustrating an example of the on/off states of associated switches and associated current signals. FIG. 7C is a schematic timing waveform diagram illustrating another example of the on/off states of associated switches and associated current signals. In this embodiment, the power conversion system 7 includes a power conversion circuit 2a and a start-up circuit 71. The circuitry structure of the power conversion circuit 2a is identical to that of FIG. 2A. In comparison with the power conversion system of FIG. 4A, the start-up circuit 71 of the power conversion system 7 of this embodiment is distinguished. In this embodiment, the start-up circuit 71 includes a third winding T31, an inductor L31, a first switch bridge arm, a second switch bridge arm and a third capacitor C71. The first switch bridge arm includes an upper switch S31 and a lower switch S32, which are electrically connected with each other. The duty cycles of the control signals for controlling the upper switch S31 and the lower switch S32 are equal. The phase difference between the control signals for controlling the upper switch S31 and the lower switch S32 is 180 degrees. In addition, the control signals for controlling the upper switch S31 and the lower switch S32 are complementary to each other. The second switch bridge arm includes an upper switch S71 and a lower switch S72, which are electrically connected with each other. The first switch bridge arm and the second switch bridge arm are electrically connected with each other. Moreover, the first switch bridge arm and the second switch bridge arm are collaboratively formed as an input terminal of the start-up circuit 71, which is also referred as an input voltage terminal of the power conversion system 7. In this embodiment, the first terminal of the power conversion system 7 is the input voltage terminal, and the second terminal of the power conversion system 7 is an output voltage terminal. The input terminal of the start-up circuit 71 is electrically connected with the first positive electrode V1+ and the first negative electrode V1− of the first terminal of the power conversion system 7. The third winding T31 is electromagnetically coupled with the two first windings T21, T22 and two second windings T23, T24. The first terminal of the serially-connected branch of the third winding T31 and the inductor L31 is connected with the midpoint of the first switch bridge arm, i.e., the node between the upper switch S31 and the lower switch S32. The second terminal of the serially-connected branch of the third winding T31 and the inductor L31 is connected with the midpoint of the second switch bridge arm, i.e., the node between the upper switch S71 and the lower switch S72. Consequently, the voltage across the first terminal and the second terminal of the serially-connected branch of the third winding T31 and the inductor L31 is an alternating voltage. The third capacitor C71 is electrically connected with the first switch bridge arm and the second switch bridge arm. That is, the third capacitor C71 is electrically connected with the input terminal of the start-up circuit 71 (i.e., the input voltage terminal of the power conversion system 7).

Please refer to FIG. 7B. In an embodiment, the on durations of the upper switch S71 and the lower switch S72 of the second bridge arm are zero. That is, the upper switch S71 and the lower switch S72 are not turned on. Consequently, the waveforms of the control signals corresponding to the upper switch S71 and the lower switch S72 are not shown. Moreover, a resonant effect between the parasitic capacitor of the upper switch S71, the parasitic capacitor of the lower switch S72 and the inductance L31 is generated. Moreover, the cooperation between the parasitic diode (not shown) of the upper switch S71 and the parasitic diode (not shown) of the lower switch S72 provides a clamping function of protecting the upper switch S71 and lower switch S72.

In other embodiments, the loading capacity of the power conversion system 7 during the start-up process can be increased by turning on the second switch bridge arm. Please refer to FIG. 7B. At the time point t0, the upper switch S31 of the first switch bridge arm and the lower switch S72 of the second switch bridge arm are simultaneously turned on. In the interval between the time point t0 and the time point t1, the resonant effect between the inductor L31 and the third capacitor C71 of the starting circuit 71 is generated. In the interval between the time point t3 and the time point t4, the lower switch S32 of the first switching bridge arm and the upper switch S71 of the second switching bridge arm are simultaneously turned on. Consequently, in the interval between the time point t3 and the time point t4, the resonant effect between the inductor L31 and the third capacitor C71 is also generated. The lower switch S72 of the second switch bridge arm and the upper switch S31 of the first switch bridge arm are simultaneously turned on. In addition, the on duration of the lower switch S72 of the second switch bridge arm is shorter than the on duration of the upper switch S31 of the first switch bridge arm. The upper switch S71 of the second switch bridge arm and the lower switch S32 of the first switch bridge arm are simultaneously turned on. In addition, the on duration of the upper switch S71 of the second switch bridge arm is shorter than the on duration of the lower switch S32 of the first switch bridge arm. Due to this control mechanism, the voltage across the first terminal and the second terminal of the serially-connected branch of the third winding T31 and the inductor L31 is an alternating voltage. In addition, the flying capacitors and the output capacitor are pre-charged through the electromagnetic coupling effect between the first windings, the second windings and the third winding.

Of course, the control circuit 50 as shown in FIG. 5A, the start-up circuit 41 as shown in FIG. 6A and the start-up circuit 71 as shown in FIG. 7A may also be applied to the power conversion circuits having asymmetric circuit topologies as shown in FIGS. 1A and 1B and the power conversion circuits having symmetric circuit topologies as shown in FIGS. 2C and 2D. The operations of the power conversion circuits are similar to those of the above embodiment, and are not redundantly described herein.

Figure 8A:
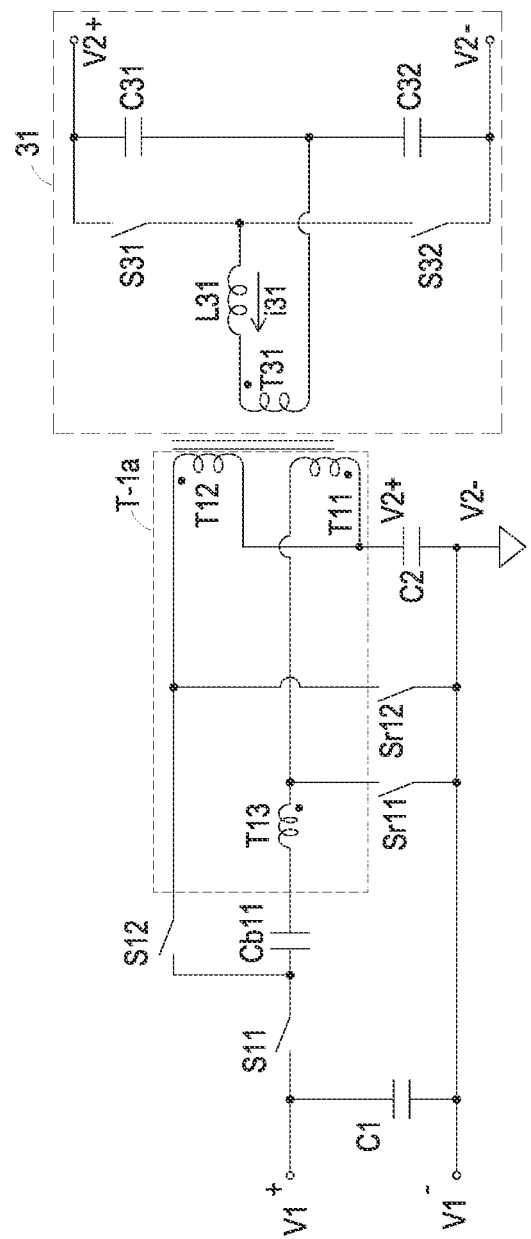
FIG. 8A is a schematic circuit diagram illustrating a power conversion system according to a sixth embodiment of the present invention.
Figure 8B:
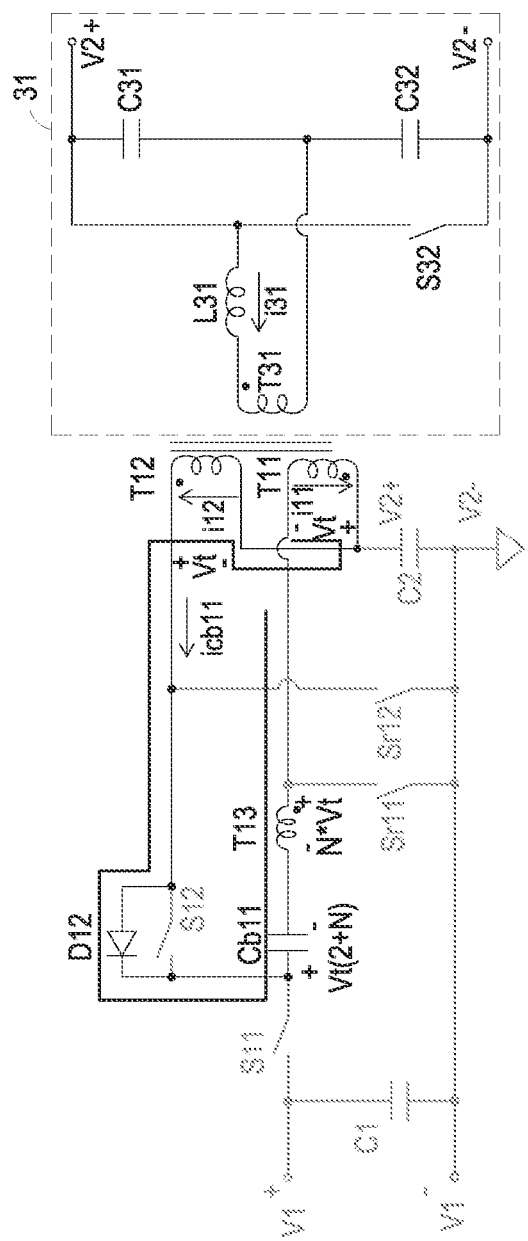
FIGS. 8B and 8C are schematic circuit diagrams illustrating the operations of the power conversion system as shown in FIG. 8A.
Figure 8C:
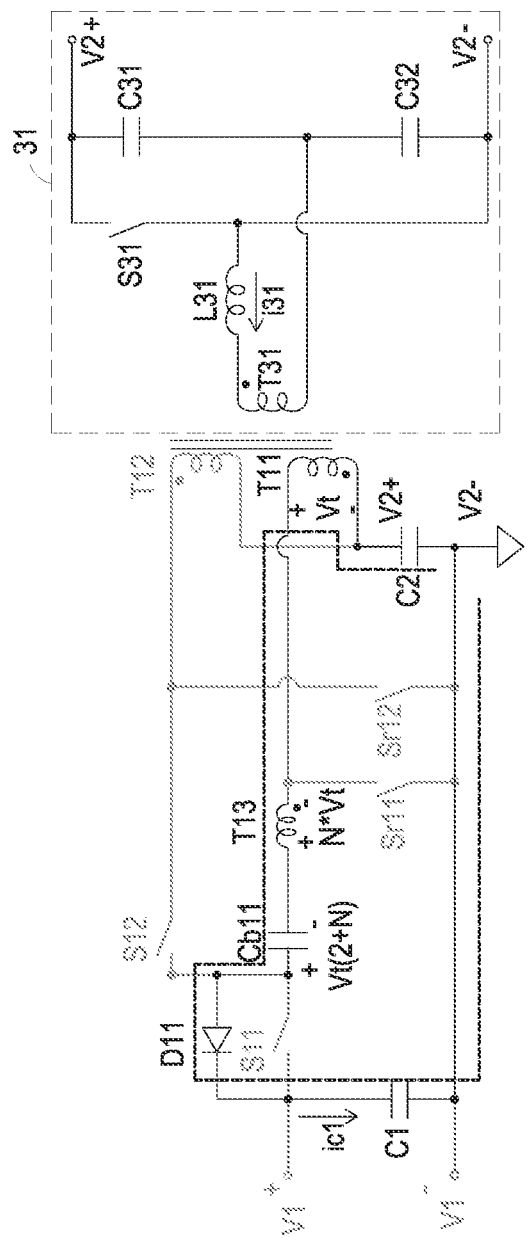

The power conversion circuit of the present invention has the function of converting the electric power in the bidirectional manner. In the following embodiment, the first terminal of the power conversion circuit is the output voltage terminal, and the second terminal of the power conversion circuit is the input voltage terminal. FIG. 8A is a schematic circuit diagram illustrating a power conversion system according to a sixth embodiment of the present invention. FIGS. 8B and 8C are schematic circuit diagrams illustrating the operations of the power conversion system as shown in FIG. 8A. The operations of the power conversion system 8 of this embodiment are similar to those of FIG. 3A, and are not redundantly described herein. In this embodiment, the first terminal of the power conversion system 8 (including the first positive electrode V1+ and the first negative electrode V1−) is the output voltage terminal, and the second terminal of the power conversion system 8 (including the second positive electrode V2+ and the second negative electrode V2−) is the input voltage terminal. That is, the input terminal of the start-up circuit 31 is electrically connected with the input voltage terminal of the power conversion system 8. In addition, the input terminal of the start-up circuit 31 is electrically connected with the second positive electrode V2+ and the second negative electrode V2− of the power conversion system 8.

The waveform of associated signal for controlling the start-up circuit 31 is similar to that of FIG. 3D. Please refer to FIG. 8B. At the time point t0, the upper switch S31 is turned on, and the lower switch S32 is turned off. In addition, the current i31 in the start-up circuit 31 flows through the upper switch S31 and the inductor L31. At this time, the parasitic diode D12 of the second switch S12 is turned on, and the first windings T11 and T12 and the second winding T13 are electromagnetically coupled with each other to charge the flying capacitor Cb11. For example, the terminal voltage across the first winding T11 is Vt, and the terminal voltage across the first winding T12 is Vt. Consequently, the terminal voltage across the second winding T13 is equal to N×Vt, and the terminal voltage of the flying capacitor Cb11 is charged to (2+N)×Vt. At the time point t1, the upper switch S31 is turned off, and the current i31 flows through the parasitic diode (not shown) of the lower switch S32 and the lower capacitor C32. In addition, the third winding T31 is in the freewheeling state. The flying capacitor Cb11 is charged by the first windings T11, T12 and the second winding T13 through the parasitic diode D12.

Please refer to FIG. 8C. At the time point t3, the lower switch S32 is turned on. The current i31 in the start-up circuit 31 flows through the upper capacitor C31, the third winding T31, the inductance L31 and the lower switch S32. The parasitic diode D11 of the first switch S11 is turned on. The first winding T11, the second winding T13 and the flying capacitor Cb11 are electromagnetically coupled with each other to charge the output capacitor of the power conversion system (i.e., the first capacitor C1). Meanwhile, the terminal voltage across the first winding T11 is Vt, the terminal voltage across the second winding T13 is equal to N×Vt, and the terminal voltage of the flying capacitor Cb11 is equal to (2+N)×Vt. Consequently, the output voltage of the power conversion system 8 may be expressed as: V1=V2+Vt(3+2N), wherein V1 is the voltage at the first terminal of the power conversion system 8, and V2 is the voltage at the second terminal of the power conversion system 8.

At the time point t4, the lower switch S32 is turned off, and the current i31 flows through the parasitic diode (not shown) of the upper switch S31 and the upper capacitor C31. The third winding T31 is in the freewheeling state. At this time, the first capacitor C1 is charged through the electromagnetic coupling effect of the first winding T11, the third winding T31 and the flying capacitor Cb11. During the start-up process of the start-up circuit 31, the voltage Vt at the winding side is gradually increased. When the output voltage V1 of the power conversion system 8 detected by the control circuit reaches the preset voltage of the power conversion system 8, the start-up process of the power conversion system 8 is completed. At the same time, the on/off state of the at least one switch in the first switch unit and the second switch unit of the power conversion circuit is switched.

Figure 9A:
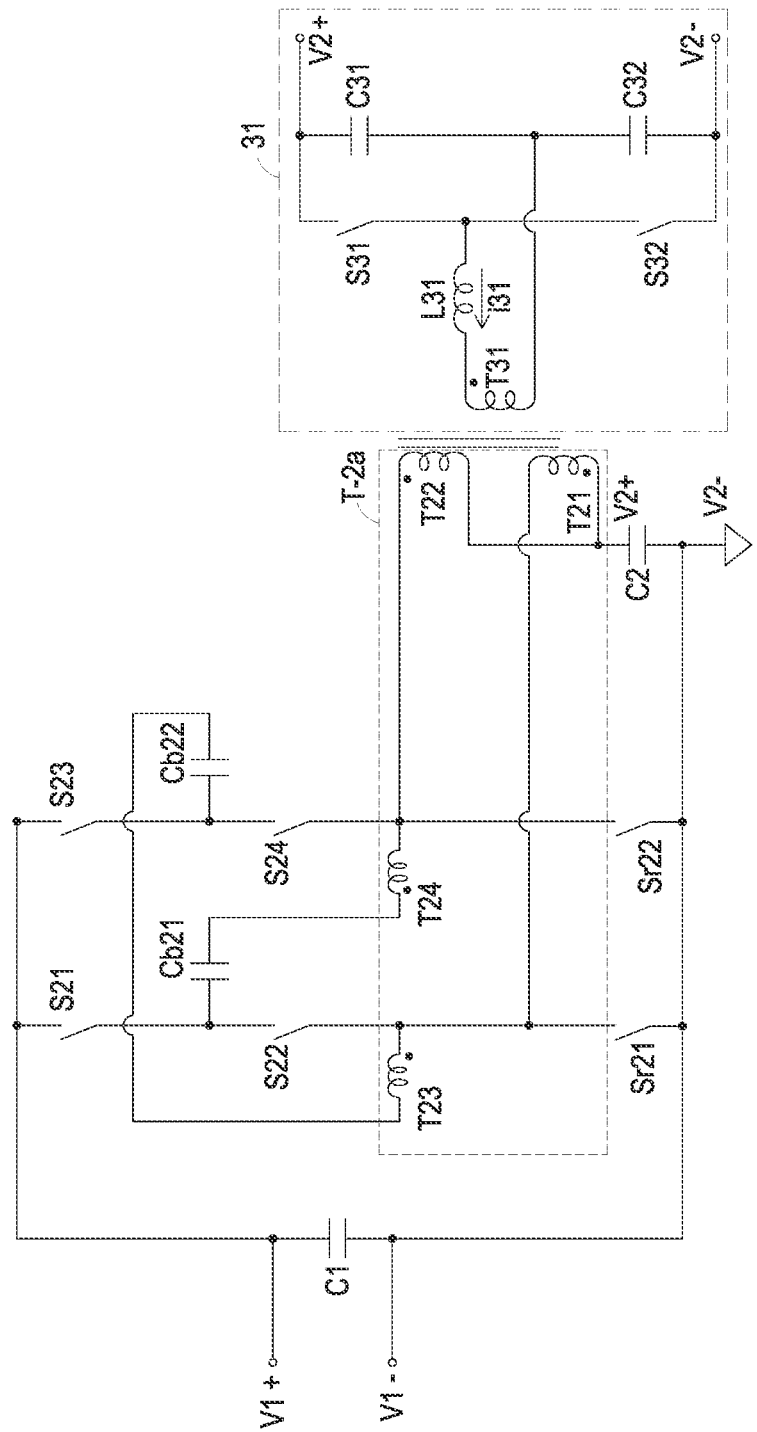
FIG. 9A is a schematic circuit diagram illustrating a power conversion system according to a seventh embodiment of the present invention.
Figure 9B:
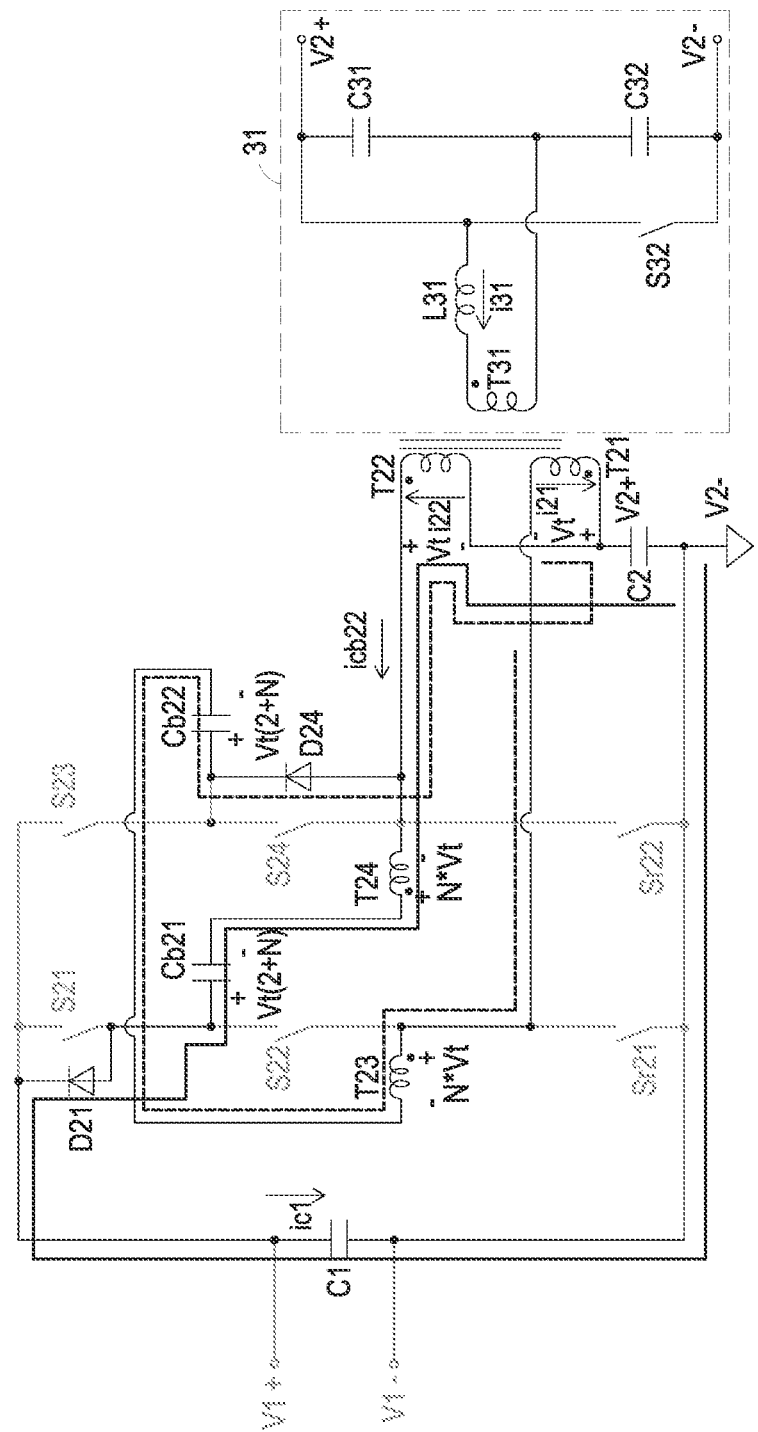
FIGS. 9B and 9C are schematic circuit diagrams illustrating the operations of the power conversion system as shown in FIG. 9A.
Figure 9C:
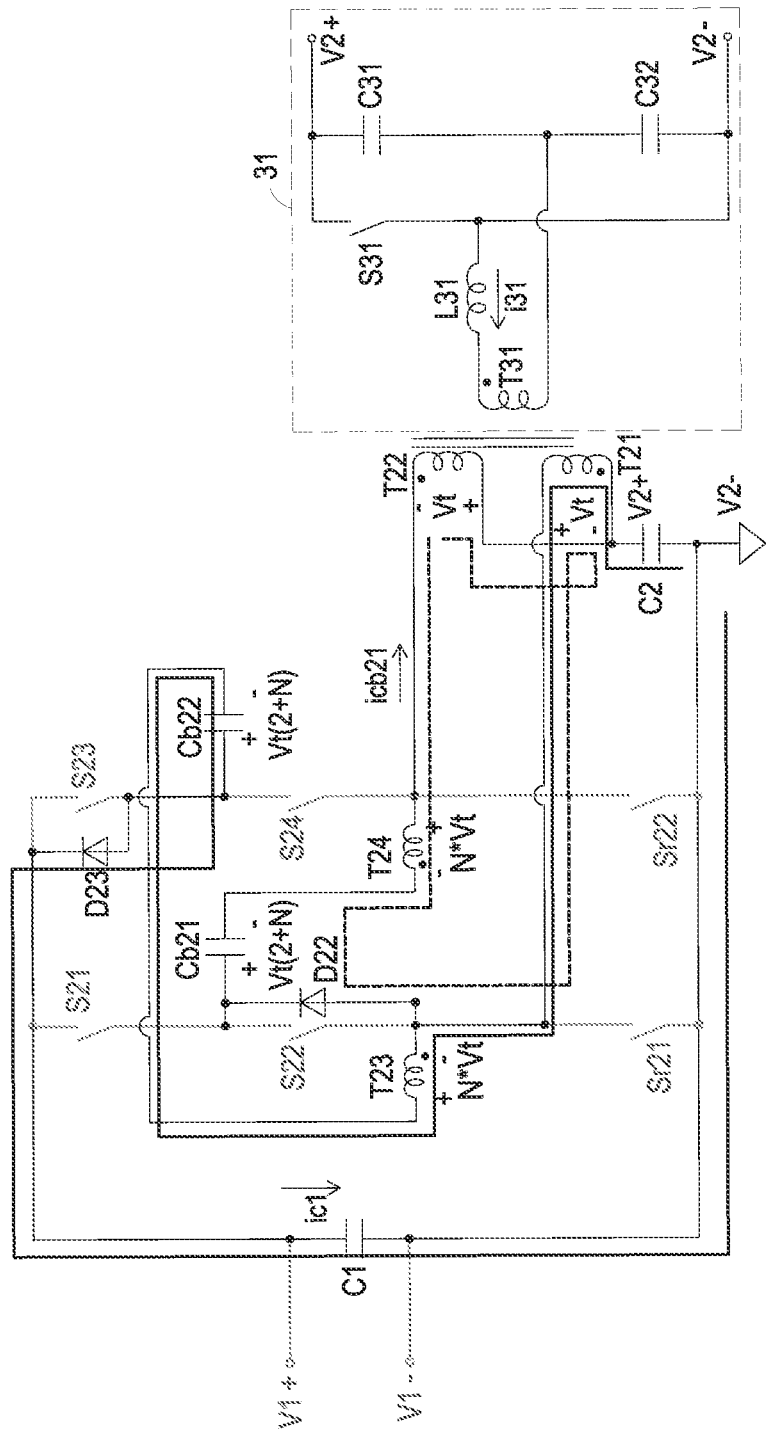

FIG. 9A is a schematic circuit diagram illustrating a power conversion system according to a seventh embodiment of the present invention. FIGS. 9B and 9C are schematic circuit diagrams illustrating the operations of the power conversion system as shown in FIG. 9A. The operations of the power conversion system 9 of this embodiment are similar to those of FIG. 4A, and are not redundantly described herein. In this embodiment, the first terminal of the power conversion system 9 (including the first positive electrode V1+ and the first negative electrode V1−) is the output voltage terminal, and the second terminal of the power conversion system 9 (including the second positive electrode V2+ and the second negative electrode V2−) is the input voltage terminal. That is, the input terminal of the start-up circuit 31 is electrically connected with the input voltage terminal of the power conversion system 9. In addition, the input terminal of the start-up circuit 31 is electrically connected with the second positive electrode V2+ and the second negative electrode V2− of the power conversion system 9.

The waveform of associated signal for controlling the start-up circuit 31 is similar to that of FIG. 3D. Please refer to FIG. 9B. At the time point t0, the lower switch S32 is turned off. In addition, the current i31 in the start-up circuit 31 flows through the upper switch S31, the inductor L31, the third winding T31 and the lower capacitor C32. In the time interval between the time point t0 and the time point t1, the current i31 rises linearly. At this time, the parasitic diode Dr24 of the second switch Sr24 is turned on, and the first windings T21 and T22 and the second winding T23 are electromagnetically coupled with each other to charge the second flying capacitor Cb22. For example, the terminal voltage across the first winding T21 is Vt, and the terminal voltage across the first winding T22 is Vt. Consequently, the terminal voltage across the second winding T23 is equal to N×Vt, and the terminal voltage of the second flying capacitor Cb22 is charged to (2+N)×Vt. Due to the electromagnetic coupling effect of the first winding T21, the second winding T22 and the first flying capacitor Cb21, the output capacitor of the power conversion system 9 (i.e., the first capacitor C1) is charged through the parasitic diode D21 of the first switch S21. Consequently, the output voltage of the power conversion system 9 may be expressed as: V1=V2+Vt(3+2N), wherein V1 is the voltage at the first terminal of the power conversion system 9, and V2 is the voltage at the second terminal of the power conversion system 9. At the time point t1, the upper switch S31 is turned off, and the current i31 flows through the parasitic diode (not shown) of the lower switch S32 and the lower capacitor C32. The third winding T31 is in a freewheeling state. At this time, the second flying capacitor Cb22 is still pre-charged by the first winding T21, T22 and the second winding T23 through the parasitic diode D22. Due to the electromagnetic coupling effect of the first winding T21, the second winding T22 and the first flying capacitor Cb21, the first capacitor C1 is still charged through the parasitic diode D21 of the first switch S21.

Please refer to FIGS. 9C and 3D. At the time point t3, the lower switch S32 is turned on, and the current i31 in the start-up circuit 31 flows through the upper capacitor C31, the third winding T31, the inductor L31 and the lower switch S32. In the time interval between the time point t3 and the time point t4, the current i31 rises linearly along the reverse direction. At this time, the parasitic diode D22 of the fifth switch S22 is turned on, and the first windings T21 and T22 and the second winding T24 are electromagnetically coupled with each other to charge the first flying capacitor Cb21. For example, the terminal voltage across the first winding T21 is Vt, and the terminal voltage across the first winding T22 is Vt. Consequently, the terminal voltage across the second winding T24 is equal to N×Vt, and the terminal voltage of the first flying capacitor Cb21 is charged to (2+N)×Vt. Due to the electromagnetic coupling effect of the first winding T21, the second winding T23 and the second flying capacitor Cb22, the first capacitor C1 of the power conversion system 9 is charged through the parasitic diode D23 of the fourth switch S23. Consequently, the output voltage of the power conversion system 9 may be expressed as: V1=V2+Vt(3+2N), wherein V1 is the voltage at the first terminal of the power conversion system 9, and V2 is the voltage at the second terminal of the power conversion system 9. At the time point t4, the lower switch S32 is turned off, and the current i31 flows through the parasitic diode (not shown) of the upper switch S31 and the upper capacitor C31. The third winding T31 is in a freewheeling state. At this time, the first flying capacitor Cb21 is still charged by the first winding T21, T22 and the second winding T24 through the parasitic diode D22. Due to the electromagnetic coupling effect of the first winding T21, the second winding T22 and the second flying capacitor Cb22, the first capacitor C1 of the power conversion system 9 is still charged through the parasitic diode D23 of the fourth switch S23. During the start-up process of the start-up circuit 31, the voltage Vt at the winding side is gradually increased. When the output voltage V1 of the power conversion system 9 detected by the control circuit reaches the preset voltage of the power conversion system 9, the start-up process of the power conversion system 9 is completed. At the same time, the on/off state of the at least one switch in the first switch unit and the second switch unit of the power conversion circuit is switched.

In the power conversion system 8 of FIG. 8A and the power conversion system 9 of FIG. 9A, the preset voltage is a steady state voltage of the power conversion system. Alternatively, the preset voltage is 70% of the steady state voltage of the power conversion system 8, 9, or the preset voltage is in the range between 70% of the steady state voltage of the power conversion system 8, 9 and the steady state voltage of the power conversion system 8, 9. The start-up process of the power conversion system 8, 9 is completed when the terminal voltage of each flying capacitor is pre-charged to a voltage which is equal to or higher than 70% of the steady state voltage of the corresponding flying capacitor and the terminal voltage of the output capacitor is pre-charged to a voltage which is equal to or higher than 70% of the steady state output voltage. At the same time, the on/off state of the at least one switch in the first switch unit and the second switch unit of the power conversion circuit is switched.

The start-up circuit 31 of FIG. 3A, the start-up circuit 31 of FIG. 4A, the start-up circuit 41 of FIG. 6A and the start-up circuit 71 of FIG. 7A may be applied to the power conversion circuit with the fixed ratio of the input voltage to the output voltage. In case that the second winding of the magnetic element is omitted, the ratio of the input voltage to the output voltage in each of the power conversion circuits as shown in FIGS. 3A to 9A is fixed. The operations of the power conversion circuits are similar to those of the above embodiment, and are not redundantly described herein.

In some embodiments, the power conversion system includes a plurality of power conversion circuits, and the plurality of power conversion circuits are connected with each other in parallel in an interleaving manner. Consequently, the power conversion system can be applied to the large-current situation. Moreover, the start-up circuit is used to control the soft-start action of the plurality of power conversion circuits. In the following embodiment, the power conversion system with two parallel-connected power conversion circuits 1a or 2a will be described.

Figure 10:
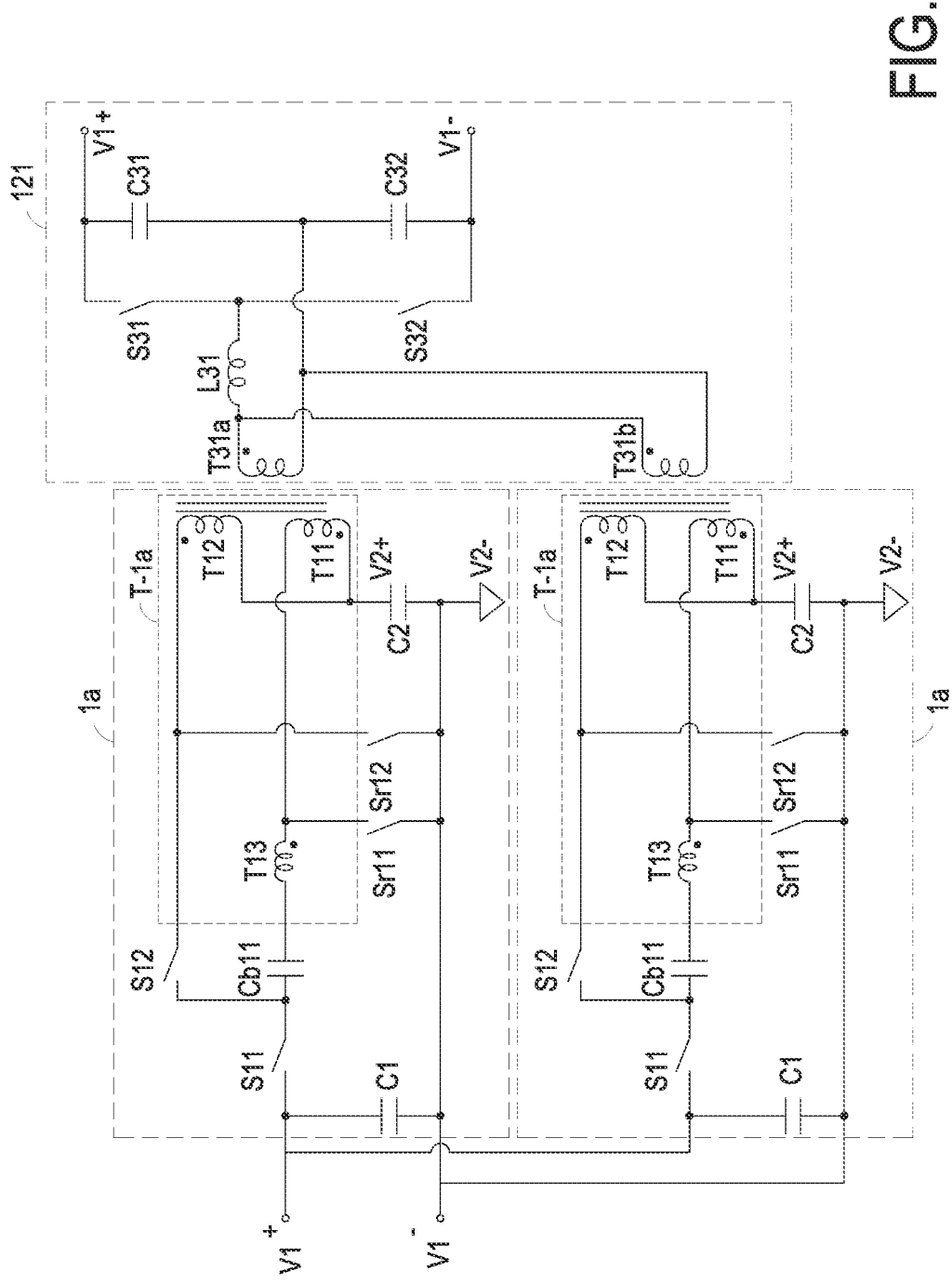
FIG. 10 is a schematic circuit diagram illustrating a power conversion system according to an eighth embodiment of the present invention.

FIG. 10 is a schematic circuit diagram illustrating a power conversion system according to an eighth embodiment of the present invention. In this embodiment, the power conversion system 120 includes two power conversion circuits 1a. The first terminals of the two power conversion circuits 1a are electrically connected with each other. The second terminals of the two power conversion circuits 1a are connected with each other. In an embodiment, the power conversion circuit 1a includes a first capacitor C1 and a second capacitor C2. In another embodiment, a single first capacitor C1 is shared by the first terminals of the two power conversion circuits 1a, and a single second capacitor C2 is shared by the second terminals of the two power conversion circuits 1a.

The power conversion system 120 further includes a start-up circuit 121. The starting circuit 121 includes two third windings T31a, T31b, an inductor L31, a switch bridge arm and a capacitor bridge arm. The switch bridge arm includes an upper switch S31 and a lower switch S32, which are electrically connected with each other. Moreover, the control signals for controlling the upper switch S31 and the lower switch S32 are the identical to those in the above embodiments. The capacitor bridge arm includes an upper capacitor C31 and a lower capacitor C32, which are electrically connected with each other. The capacitor bridge arm and the switch bridge arm are electrically connected with each other. Moreover, the capacitor bridge arm and the switch bridge arm are collaboratively formed as an input terminal of the start-up circuit 121. The input terminal of the start-up circuit 121 is electrically connected with the input voltage terminals of the two power conversion circuits 1a. In this embodiment, the first terminal of each power conversion circuit 1a is the input voltage terminal, and the second terminal of each power conversion circuit 1a is an output voltage terminal. The input terminal of the start-up circuit 121 is electrically connected with the first positive electrode V1+ and the first negative electrode V1−. The third windings T31a and T31b are electrically connected with each other in parallel. The third windings T31a and T31b are electromagnetically coupled with the first windings T11, T12 and the second windings T13 of the two power conversion circuits 1a. The parallel-connected structure of the third windings T31a and T31b is electrically connected with the inductor L31 to define a serially-connected branch. A terminal of the serially-connected branch is connected with the midpoint of the capacitor bridge arm, i.e., the node between the upper capacitor C31 and the lower capacitor C32. The other terminal of the serially-connected branch is connected with the midpoint of the switch bridge arm, i.e., the node between the upper switch S31 and the lower switch S32. Consequently, the voltage across the two terminals of the serially-connected branch is an alternating voltage. Due to the electromagnetic coupling effect between the first windings, the second windings and the third windings, the output capacitor and the flying capacitor are charged to the preset voltage. When the preset voltage is achieved, the start-up process of the power conversion system is completed. At the same time, the on/off state of the at least one switch in the first switch unit and the second switch unit of the power conversion circuit is switched.

Figure 11:
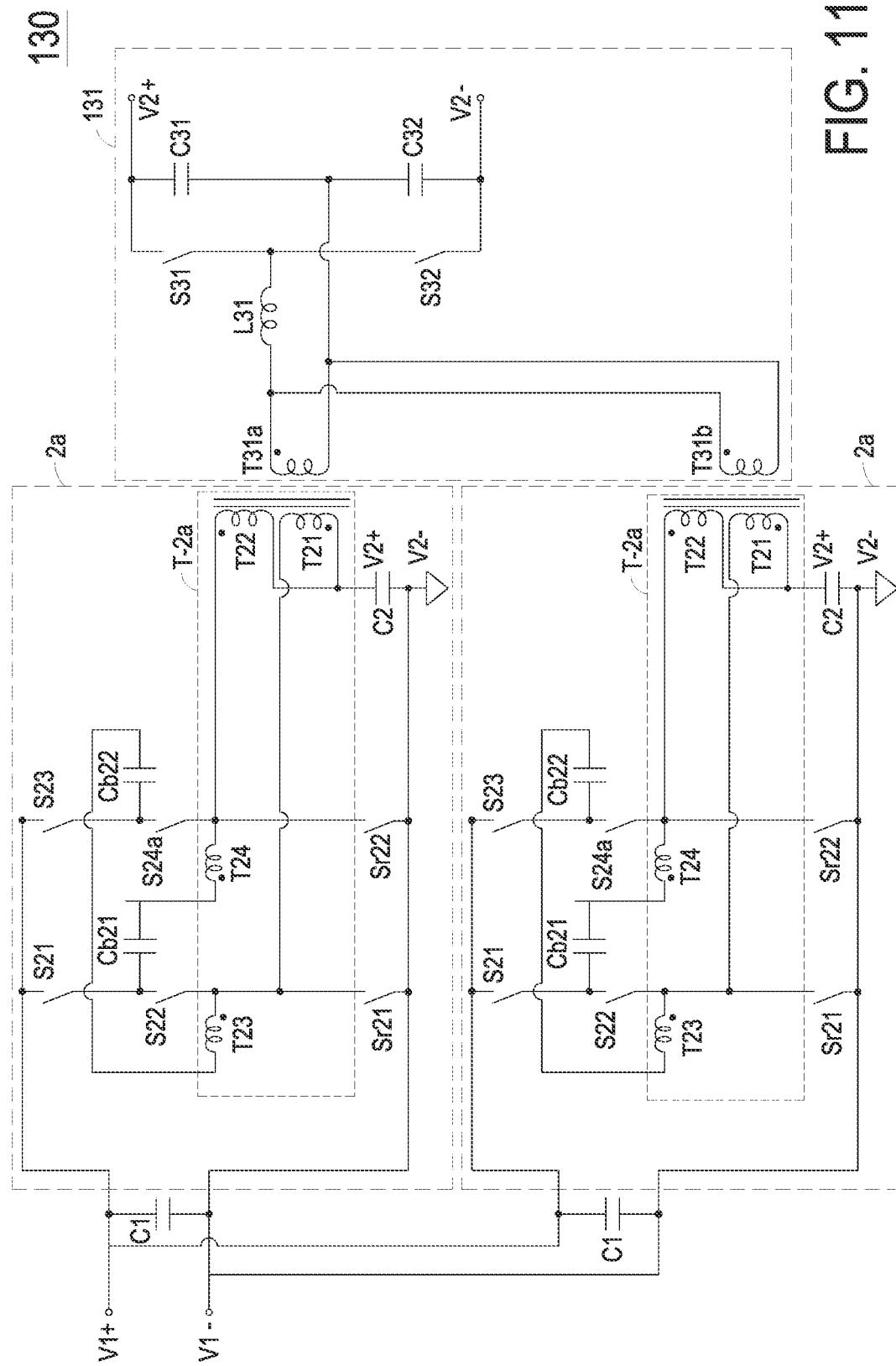
FIG. 11 is a schematic circuit diagram illustrating a power conversion system according to a ninth embodiment of the present invention.

FIG. 11 is a schematic circuit diagram illustrating a power conversion system according to a ninth embodiment of the present invention. In this embodiment, the power conversion system 130 includes two power conversion circuits 2a. The first terminals of the two power conversion circuits 2a are electrically connected with each other. The second terminals of the two power conversion circuits 2a are connected with each other. In an embodiment, the power conversion circuit 2a includes a first capacitor C1 and a second capacitor C2. In another embodiment, a single first capacitor C1 is shared by the first terminals of the two power conversion circuits 2a, and a single second capacitor C2 is shared by the second terminals of the two power conversion circuits 2a.

The power conversion system 130 further includes a start-up circuit 131. The starting circuit 131 includes two third windings T31a, T31b, an inductor L31, a switch bridge arm and a capacitor bridge arm. The switch bridge arm includes an upper switch S31 and a lower switch S32, which are electrically connected with each other. Moreover, the control signals for controlling the upper switch S31 and the lower switch S32 are the identical to those in the above embodiments. The capacitor bridge arm includes an upper capacitor C31 and a lower capacitor C32, which are electrically connected with each other. The capacitor bridge arm and the switch bridge arm are electrically connected with each other. Moreover, the capacitor bridge arm and the switch bridge arm are collaboratively formed as an input terminal of the start-up circuit 131. The input terminal of the start-up circuit 131 is electrically connected with the input voltage terminals of the two power conversion circuits 2a. In this embodiment, the first terminal of each power conversion circuit 2a is the input voltage terminal, and the second terminal of each power conversion circuit 2a is an output voltage terminal. The input terminal of the start-up circuit 131 is electrically connected with the first positive electrode V1+ and the first negative electrode V1−. The third windings T31a and T31b are electrically connected with each other in parallel. The third windings T31a and T31b are electromagnetically coupled with the first windings T21, T22 and the second windings T23, T24 of the two power conversion circuits 2a. The parallel-connected structure of the third windings T31a and T31b is electrically connected with the inductor L31 to define a serially-connected branch. A terminal of the serially-connected branch is connected with the midpoint of the capacitor bridge arm, i.e., the node between the upper capacitor C31 and the lower capacitor C32. The other terminal of the serially-connected branch is connected with the midpoint of the switch bridge arm, i.e., the node between the upper switch S31 and the lower switch S32. Consequently, the voltage across the two terminals of the serially-connected branch is an alternating voltage. Due to the electromagnetic coupling effect between the first windings, the second windings and the third windings, the output capacitor, the first flying capacitor and the second flying capacitor are charged to the preset voltage. When the preset voltage is achieved, the start-up process of the power conversion system is completed. At the same time, the on/off state of the at least one switch in the first switch unit and the second switch unit of the power conversion circuit is switched.

From the above descriptions, the present invention provides a power conversion system. The power conversion system includes a power conversion circuit and a start-up circuit. When the terminal voltages of the flying capacitor and the output capacitor are charged to the preset voltage, the start-up process of the power conversion system is completed. Consequently, the electronic components in the power conversion system (e.g., switches) will not be suffered from the impact of the large current, and the possibility of causing the damage of the electronic components is largely reduced. Moreover, the cost-effective electronic components can be employed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion system, comprising:
a power conversion circuit comprising a first terminal, a second terminal, an output capacitor, at least one switching unit, at least one flying capacitor and a magnetic element, wherein each switching unit comprises two switch groups, the at least one flying capacitor is connected between the first terminal and the second terminal of the power conversion circuit, and the magnetic element comprises two first windings, wherein the two first windings are electromagnetically coupled with each other, a first one of the two first windings is electrically connected between a first one of the two switch groups and the second terminal of the power conversion circuit, a second one of the two first windings is electrically connected between a second one of the two switch groups and the second terminal of the power conversion circuit, and opposite-polarity terminals of the two first windings are electrically connected with the second terminal of the power conversion circuit; and
a start-up circuit configured to control start-up of the power conversion circuit and comprising a third winding and an inductor, wherein the third winding is electromagnetically coupled with the two first windings, and the inductor is connected with the third winding in series to form a serially-connected branch, wherein a voltage across a first terminal and a second terminal of the serially-connected branch is an alternating voltage,
wherein during a start-up process of the power conversion circuit, the at least one flying capacitor and the output capacitor are pre-charged to a preset voltage by the alternating voltage through the third winding.

2. The power conversion system according to claim 1, wherein when the at least one flying capacitor and the output capacitor are pre-charged to the preset voltage, the start-up process of the power conversion circuit is completed, and an on/off state of at least one switch in the power conversion circuit is switched.

3. The power conversion system according to claim 1, wherein the start-up circuit further comprises a first switch bridge arm and a capacitor bridge arm, wherein the first switch bridge arm and the capacitor bridge arm are electrically connected in parallel and collaboratively formed as an input terminal of the start-up circuit, and the input terminal of the start-up circuit is electrically connected with an input voltage terminal of the power conversion system, wherein the input voltage terminal of the power conversion system is the first terminal or the second terminal of the power conversion circuit, the first switch bridge arm comprises an upper switch and a lower switch, the capacitor bridge arm comprises an upper capacitor and a lower capacitor, the first terminal of the serially-connected branch is connected with a node between the upper switch and the lower switch, the second terminal of the serially-connected branch is connected with a node between the upper capacitor and the lower capacitor, and the alternating voltage is generated by alternately turning on and turning off the upper switch and the lower switch, wherein a duty cycle of a first control signal for controlling the upper switch and a duty cycle of a second control signal for controlling the lower switch are equal, a phase difference between the first control signal and the second control signal is 180 degree, or the first control signal and the second control signal are complementary to each other.

4. The power conversion system according to claim 3, wherein the duty cycle of the first control signal and the duty cycle of the second control signal are gradually increased from zero to 50%.

5. The power conversion system according to claim 3, wherein the duty cycle of the first control signal and the duty cycle of the second control signal are fixed.

6. The power conversion system according to claim 3, wherein the inductor, the upper capacitor and the lower capacitor resonate with each other.

7. The power conversion system according to claim 3, wherein the start-up circuit further comprises:
a first clamp diode, wherein a cathode of the first clamp diode is electrically connected with a first terminal of the upper capacitor, and an anode of the first clamp diode is electrically connected with a second terminal of the upper capacitor; and
a second clamp diode, wherein a cathode of the second clamp diode is electrically connected with a first terminal of the lower capacitor, and an anode of the second clamp diode is electrically connected with a second terminal of the lower capacitor.

8. The power conversion system according to claim 1, wherein the start-up circuit further comprises a first switch bridge arm and a second switch bridge arm, wherein the first switch bridge arm and the second switch bridge arm are electrically connected in parallel and collaboratively formed as an input terminal of the start-up circuit, and the input terminal of the start-up circuit is electrically connected with an input voltage terminal of the power conversion system, wherein the input voltage terminal of the power conversion system is the first terminal or the second terminal of the power conversion circuit, the first switch bridge arm comprises a first upper switch and a first lower switch, the second switch bridge arm comprises a second upper switch and a second lower switch, the first terminal of the serially-connected branch is connected with a node between the first upper switch and the first lower switch, the second terminal of the serially-connected branch is connected with a node between the second upper switch and the second lower switch, and the alternating voltage is generated by alternately turning on and turning off the first upper switch and the first lower switch, wherein a duty cycle of a first control signal for controlling the first upper switch and a duty cycle of a second control signal for controlling the first lower switch are equal, a phase difference between the first control signal and the second control signal is 180 degree, or the first control signal and the second control signal are complementary to each other.

9. The power conversion system according to claim 8, wherein when the second upper switch and the second lower switch are in an off state, the inductor, a parasitic capacitor of the first upper switch and a parasitic capacitor of the first lower switch resonate with each other.

10. The power conversion system according to claim 8, wherein the second lower switch is turned on when the first upper switch is turned on, and the second upper switch is turned on when the first lower switch is turned on, wherein an on duration of the second lower switch is shorter than an on duration of the first upper switch, and an on duration of the second upper switch is shorter than an on duration of the first lower switch.

11. The power conversion system according to claim 1, wherein the first terminal of the power conversion circuit comprises a first positive electrode and a first negative electrode, the second terminal of the power conversion circuit comprises a second positive electrode and a second negative electrode, the output capacitor is electrically connected with the first terminal or the second terminal of the power conversion circuit, and the at least one switching unit comprises a first switching unit and a second switching unit, wherein the first switching unit comprises a first switch group and a second switch group, and the second switching unit comprises a third switch group and a fourth switch group, wherein the third switch group is electrically connected with the first switch group, the fourth switch group is electrically connected with the second switch group, and a first terminal of the third switch group and a first terminal of the fourth switch group are electrically connected with the first negative electrode, wherein the first one of the two first windings is electrically connected between the third switch group and the second terminal of the power conversion circuit, and the second one of the two first windings is electrically connected between the fourth switch group and the second terminal of the power conversion circuit.

12. The power conversion system according to claim 11, wherein the magnetic element further comprises at least one second winding, and the at least one second winding and the two first windings are electromagnetically coupled with each other, wherein the second winding and the flying capacitor are electrically connected between a first terminal of the first switch group and a first terminal of the corresponding first winding, and a terminal of the second winding and the first terminal of the corresponding first winding are opposite-polarity terminals and electrically connected with each other, wherein a turn ratio between the second winding, the first one of the two first windings and the second one of the two first windings is N:1:1, wherein N is a positive value.

13. The power conversion system according to claim 1, wherein the magnetic element has an equivalent leakage inductor, wherein a resonant effect between the equivalent leakage inductor and the at least one flying capacitor generates a resonant current, and the resonant current transfers electric energy to the first terminal or the second terminal of the power conversion circuit.

14. The power conversion system according to claim 1, wherein the inductor is an external inductor, or the inductor is a leakage inductor that is electromagnetically coupled with the two first windings and the third winding.

15. A power conversion system, comprising:
a power conversion circuit comprising a first terminal, a second terminal, an output capacitor, at least one first switching unit, a second switching unit, at least one flying capacitor and a magnetic element, wherein the first switching unit comprises a first switch group and a second switch group, and the second switching unit comprises a third switch group and a fourth switch group, wherein the at least one flying capacitor is connected between the first terminal and the second terminal of the power conversion circuit, and the magnetic element comprises two first windings, wherein the two first windings are electromagnetically coupled with each other, a first one of the two first windings is electrically connected between the third switch group and the second terminal of the power conversion circuit, a second one of the two first windings is electrically connected between the fourth switch group and the second terminal of the power conversion circuit, and opposite-polarity terminals of the two first windings are electrically connected with the second terminal of the power conversion circuit, wherein the magnetic element has an equivalent leakage inductor, a resonant effect between the equivalent leakage inductor and the at least one flying capacitor generates a resonant current, and the resonant current transfers electric energy to the first terminal or the second terminal of the power conversion circuit; and
a start-up circuit, wherein during a start-up process of the power conversion circuit, the output capacitor is pre-charged to a first preset voltage, and the at least one flying capacitor is pre-charged to a second preset voltage, wherein the first preset voltage is higher than or equal to 70% of a steady state voltage of the output capacitor, and the second preset voltage is higher than or equal to 70% of a steady state voltage of the corresponding flying capacitor.

16. The power conversion system according to claim 15, wherein when the output capacitor is pre-charged to the first preset voltage, and the at least one flying capacitor are pre-charged to the second preset voltage, the start-up process of the power conversion circuit is completed, and an on/off state of at least one switch in the power conversion circuit is switched.

17. The power conversion system according to claim 15, wherein the start-up circuit comprises:
a third winding, wherein the third winding is electromagnetically coupled with the two first windings;
an inductor, wherein the inductor and the third winding are connected in series to form a serially-connected branch; and
a first switch bridge arm comprising a first upper switch and a first lower switch, wherein an alternating voltage is generated by alternately turning on and turning off the first upper switch and the first lower switch, so that the at least one flying capacitor and the output voltage are pre-charged by the alternating voltage, wherein the inductor is an external inductor, or the inductor is a leakage inductor that is electromagnetically coupled with the two first windings and the third winding.

18. The power conversion system according to claim 17, wherein the start-up circuit further comprises a capacitor bridge arm, and the capacitor bridge arm comprises an upper capacitor and a lower capacitor, wherein the first switch bridge arm and the capacitor bridge arm are electrically connected in parallel and collaboratively formed as an input terminal of the start-up circuit, and the input terminal of the start-up circuit is electrically connected with an input voltage terminal of the power conversion system, wherein the input voltage terminal of the power conversion system is the first terminal or the second terminal of the power conversion circuit, a first terminal of the serially-connected branch is connected with a node between the first upper switch and the first lower switch, a second terminal of the serially-connected branch is connected with a node between the upper capacitor and the lower capacitor, and wherein the inductor, the upper capacitor and the lower capacitor resonate with each other.

19. The power system according to claim 18, wherein a duty cycle of a first control signal for controlling the first upper switch and a duty cycle of a second control signal for controlling the first lower switch are gradually increased from zero to 50%.

20. The power system according to claim 18, wherein a duty cycle of a first control signal for controlling the first upper switch and a duty cycle of a second control signal for controlling the first lower switch are fixed.

21. The power conversion system according to claim 18, wherein the start-up circuit further comprises:
a first clamp diode, wherein a cathode of the first clamp diode is electrically connected with a first terminal of the upper capacitor, and an anode of the first clamp diode is electrically connected with a second terminal of the upper capacitor; and
a second clamp diode, wherein a cathode of the second clamp diode is electrically connected with a first terminal of the lower capacitor, and an anode of the second clamp diode is electrically connected with a second terminal of the lower capacitor.

22. The power conversion system according to claim 17, wherein the start-up circuit further comprises a second switch bridge arm, wherein the first switch bridge arm and the second switch bridge arm are electrically connected in parallel and collaboratively formed as an input terminal of the start-up circuit, and the input terminal of the start-up circuit is electrically connected with an input voltage terminal of the power conversion system, wherein the input voltage terminal of the power conversion system is the first terminal or the second terminal of the power conversion circuit, the second switch bridge arm comprises a second upper switch and a second lower switch, a first terminal of the serially-connected branch is connected with a node between the first upper switch and the first lower switch, a second terminal of the serially-connected branch is connected with a node between the second upper switch and the second lower switch.

23. The power conversion system according to claim 22, wherein when the second upper switch and the second lower switch are in an off state, the inductor, a parasitic capacitor of the first upper switch and a parasitic capacitor of the first lower switch resonate with each other.

24. The power conversion system according to claim 22, wherein the second lower switch is turned on when the first upper switch is turned on, and the second upper switch is turned on when the first lower switch is turned on, wherein an on duration of the second lower switch is shorter than an on duration of the first upper switch, and an on duration of the second upper switch is shorter than an on duration of the first lower switch.

25. A power conversion system, comprising:
at least two power conversion circuits, wherein each of the at least two power conversion circuits comprises a first terminal and a second terminal, the first terminals of the at least two power conversion circuits are electrically connected in parallel, and the second terminals of the at least two power conversion circuits are electrically connected in parallel, wherein each of the at least two power conversion circuits further comprises an output capacitor, at least one switching unit, at least one flying capacitor and a magnetic element, wherein each switching unit comprises two switch groups, the at least one flying capacitor is connected between the first terminal and the second terminal of the power conversion circuit, and the magnetic element comprises two first windings, wherein the two first windings are electromagnetically coupled with each other, a first one of the two first windings is electrically connected between a first one of the two switch groups and the second terminal of the power conversion circuit, a second one of the two first windings is electrically connected between a second one of the two switch groups and the second terminal of the power conversion circuit, and opposite-polarity terminals of the two first windings are electrically connected with the second terminal of the power conversion circuit; and a start-up circuit configured to control start-up of the at least two power conversion circuits and comprising two third windings, wherein the two third windings are connected in parallel, and each of the two third windings is electromagnetically coupled with the magnetic element of a corresponding power conversion circuit of the at least two power conversion circuits.

* * * * *